US006791757B2

(12) United States Patent
Hobbs et al.

(10) Patent No.: US 6,791,757 B2
(45) Date of Patent: Sep. 14, 2004

(54) OPTICAL DEVICE FOR FILTERING AND SENSING

(75) Inventors: Douglas S. Hobbs, Lexington, MA (US); James J. Cowan, Lexington, MA (US)

(73) Assignee: CoHo Holdings, LLC, Lexington, MA (US)

( * ) Notice: Subject to any disclaimer, the term of this patent is extended or adjusted under 35 U.S.C. 154(b) by 95 days.

(21) Appl. No.: 10/213,583

(22) Filed: Aug. 6, 2002

(65) Prior Publication Data

US 2003/0002156 A1 Jan. 2, 2003

Related U.S. Application Data

(63) Continuation-in-part of application No. 09/615,011, filed on Jul. 12, 2000.
(60) Provisional application No. 60/310,399, filed on Aug. 6, 2001.

(51) Int. Cl.[7] .............................................. G02B 27/00
(52) U.S. Cl. ....................... 359/578; 359/579; 359/260; 359/261; 359/315; 359/318; 359/247; 349/198
(58) Field of Search ................................ 359/247, 250, 359/252–253, 260–261, 315–318, 321, 578, 579; 349/198

(56) References Cited

U.S. PATENT DOCUMENTS

| 5,598,300 | A | * | 1/1997 | Magnusson et al. ........ 359/566 |
| 5,726,805 | A | * | 3/1998 | Kaushik et al. ............. 359/589 |
| 6,035,089 | A | * | 3/2000 | Grann et al. ................ 385/129 |
| 2002/0164105 | A1 | * | 11/2002 | Simpson et al. .............. 385/11 |
| 2003/0039446 | A1 | * | 2/2003 | Hutchinson et al. .......... 385/39 |
| 2003/0124029 | A1 | * | 7/2003 | Webb et al. ................. 422/102 |

\* cited by examiner

*Primary Examiner*—Leo Boutsikaris
(74) *Attorney, Agent, or Firm*—Brian M. Dingman, Esq.; Mirick O'Connell DeMallie & Lougee LLP

(57) ABSTRACT

An apparatus for filtering electromagnetic waves and sensing deposition of chemical species, the apparatus having a substrate having a surface relief structure containing at least one dielectric body with physical dimensions smaller than the wavelength of the filtered electromagnetic waves, such structures repeated in a two dimensional array covering at least a portion of the surface of the first substrate. The apparatus may include one, two, or more such arrays, spaced from one another to create one or more cavities between the arrays.

30 Claims, 26 Drawing Sheets

OPTICAL DEVICE FOR FILTERING AND SENSING

CROSS REFERENCE TO RELATED APPLICATION

This application claims the benefit of priority under 35 U.S.C. §119l (e) of U.S. Provisional application Serial No. 60/310,399 filed on Aug. 6, 2001, and under 35 U.S.C. §120 which is a continuation-in part of U.S. patent application Ser. No. 09/615,011 filed Jul. 12, 2000.

FIELD OF THE INVENTION

This invention relates to an optical device that filters wavelengths of light, and can be used to sense deposited chemical or biological materials.

BACKGROUND OF THE INVENTION

In order to satisfy the bandwidth demand arising from increased use of the internet, the optical telecommunications (telecom) industry have incorporated wavelength division multiplexing (WDM) in its networks. Entirely new classes of optical devices and systems are needed to manipulate and distribute the multiple channels (defined by wavelengths of light) envisioned by optical network designers. Tunable transmitters using tunable lasers as the source, are becoming a standard replacing multiple fixed wavelength lasers. On a receiving end however, the wavelength distinction is currently accomplished by fixed wavelength, discrete components such as fiber Bragg grating filters, thin film interference filters, arrayed waveguide grating circuits, or grating based de-multiplexers. This is analogous to the early days of radio where each broadcast channel required a fixed crystal oscillator at the receiver. To produce tunable receivers for telecom networks, a suitable tunable filter technology is needed, an equivalent to radio's electronically tuned oscillator which replaced multiple channel filters with a single dynamic device.

There is an immediate need for dynamic devices which can actively tune between channels with low signal loss, combining the function of both switches and multiplexers. A tunable filter device can replace both switches and space multiplexers, yielding a reconfigurable tunable switch module.

Many approaches for producing tunable filters are under development, but few of these have the potential to be commercially accepted. Here we describe a new approach for constructing both fixed and tunable filters which has the advantage of low cost production combined with the narrow band operation and filter shape requirements of telecom.

On a new matter, optical sensors that can detect the presence and concentration of a material deposited on a surface have a great number of applications in the fields of biotechnology and chemical analysis. High sensitivity pollution sensors, for example, are typically used to detect the presence of contaminants in water supplies and in the air we breath. A wide range of benefits can be realized in the biotechnology field if a sensor could detect the concentration of viruses and bacteria in a sample of blood or identify various proteins.

Typical biological sensors (biosensors) utilize fluorescent chemical compounds which are used to "tag" various protein or DNA molecules. When such molecules are deposited onto a surface through attachment to "receptor" chemicals, the presence and concentration of the tagged chemicals can be determined by the brightness of the light emitted by the fluorescent compounds. Recently, this technique gained prominence due to the rapid sequencing of the human genome.

Fluorescence-based biosensors are limited to the extent that the fluorescent compounds used are not applicable to all materials, such as the huge number of proteins generated in the human body. In many applications, a highly sensitive detection method is needed which does not require the use of fluorescent chemical tags. Such a method can be realized using an optical resonance phenomenon such as the highly complex surface plasmon resonance (SPR). Using a surface structure resonance phenomena, the optical filters described herein can be used to produce biosensors, which can detect minute concentrations of chemicals through a shift in the wavelength of light resonated from the sensor's surface. This type of response cannot be obtained from other filtering methods such as thin-film interference filters and fiber Bragg grating filters.

SUMMARY OF THE INVENTION

One aspect of the present invention involves a guided mode resonance surface structure optical filter that does not exhibit polarization dependence. That is, an incident beam of light need not be properly oriented so that it strikes the device in a particular way for the incident light to be adjusted or tuned properly. Instead, incident light having any polarization orientation can be adjusted or tuned. This is achieved via a circular symmetry supported by an array of surface structures with various cross-sectional shapes. One or more dimensions of the surface structure can be smaller than the wavelength of light that is reflected or redirected such that no light is scattered or diffracted.

Another aspect of the present invention is directed toward providing an optical wavelength filter device for filtering wavelengths in optical telecommunications systems. Typically, a filter structure according to certain principles of the present invention experiences minimal loss due to a polarization state of incoming light. This is achieved by providing a guided-mode surface structure filter that is formed of dielectric bodies of various predetermined shapes such as cylinders or holes repeated over the surface of a substrate and arranged in a predetermined symmetrical pattern such as a honeycomb or hexagon. It is noted that the term "body" as used herein may include "holes" filled with air or some other dielectric material.

As mentioned, a honeycomb surface pattern of such bodies can provide a high degree of circular symmetry, which allows a light beam comprising a broad range of wavelengths to be filtered efficiently without undue loss caused by the polarization state of incident light. In other words, the optical device according to the present invention can be polarization independent.

Another aspect of the present invention is directed towards an optical filter having one or multiple guided-mode surface structures to reflect a narrow range of light wavelengths from a broad spectrum of incident light. A surface structure can include a body of material forming an array or field of cylindrical holes, cylinders, or other suitable shapes.

In one application, two or more guided-mode resonance surface structures can be disposed substantially parallel and opposite to each other, thus forming a resonant cavity therebetween. Light reflections from each structure provide unique filtering, thereby narrowing the wavelength range of light that is reflected off the surface.

In another application, multiple guided-mode resonance surface structures can be grouped to form more than one resonant cavity. Light reflections from each cavity provide unique filtering, and light reflections from each cavity can be weakly or strongly coupled to the other cavities, thereby narrowing and shaping the wavelength range of light that is reflected off the surface.

Another aspect of the present invention is directed towards an optical wavelength filter device optimized to meet the isolation, loss, and narrow pass bands required by optical telecommunications applications. This can be achieved by providing two or more guided-mode surface structures (polarization independent filters) disposed substantially parallel or angled with respect to each other to form the aforesaid resonant cavity. In one application, an electro-optic medium having a controllable index of refraction can be disposed within the resonant cavity to adjust which of multiple wavelengths will be transmitted or reflected. An electric field can be applied to adjust the index of refraction of the electro-optic medium. Alternatively, the surface structure or bodies can be formed of an electro-optic material.

Yet another aspect of the present invention involves utilizing liquid crystal material as an electro-optic material to effect the polarization independent operation of a dynamically tunable pass band, guided-mode surface structure optical filter. This can be achieved by effecting the alignment of the liquid crystal molecules such that in the static state, when no electric field is present, the molecules align their extraordinary refractive index axis perpendicular to corresponding surfaces in the cavity such as the columns or holes in the optical device. Such an alignment can be replicated within a bulk layer of liquid crystal material filing the cavity to form a tunable surface structure filter. In this manner, the liquid crystal molecular alignment can reflect the circular symmetry of the polarization independent properties.

Another aspect of the present invention involves providing a low loss pass band and isolation filter for use in optical telecommunications. This can be achieved using just a single guided-mode, polarization independent, surface structure filter as disclosed herein. A spacing, cross section, and general dimensions of the dielectric bodies of a surface structure array can be adjusted to achieve different filter characteristics.

Another aspect of the present invention involves providing a guided-mode surface structure optical filter capable of reflecting a narrow range of light wavelengths out of a broad spectrum of incident light. The center or peak wavelength within a narrow range of reflected wavelengths can shift in response to the accumulation of material deposited on the surface of the filter. Such an optical device can be operated as a sensor in which a linear displacement of the peak reflected wavelength indicates the thickness of the deposited material layer. Generally the optical device can be used to detect the presence of any semi-transparent material such as water or solvents, condensates from a vapor, organic material such as proteins, DNA, and bacteria, and chemical pollutants. In one application the optical device is a guided-mode surface structure filter with depressions or bodies repeated over the surface of a substrate in a linear or two-dimensional array. One embodiment of the optical device includes the polarization independent honeycomb arrangement of dielectric bodies as discussed herein.

One embodiment of the present invention involves providing a highly sensitive detection method for biotechnology and chemical analysis that does not require the use of fluorescent chemical tags. Such a method can be realized using an optical resonance phenomenon such as the highly complex surface plasmon resonance (SPR). Using a surface structure resonance phenomena, the optical filters described herein can be used to yield sensors with high sensitivity, capable of detecting minute concentrations of chemicals based on a shift in the wavelength of light resonated from the sensor's surface.

Figure 1:
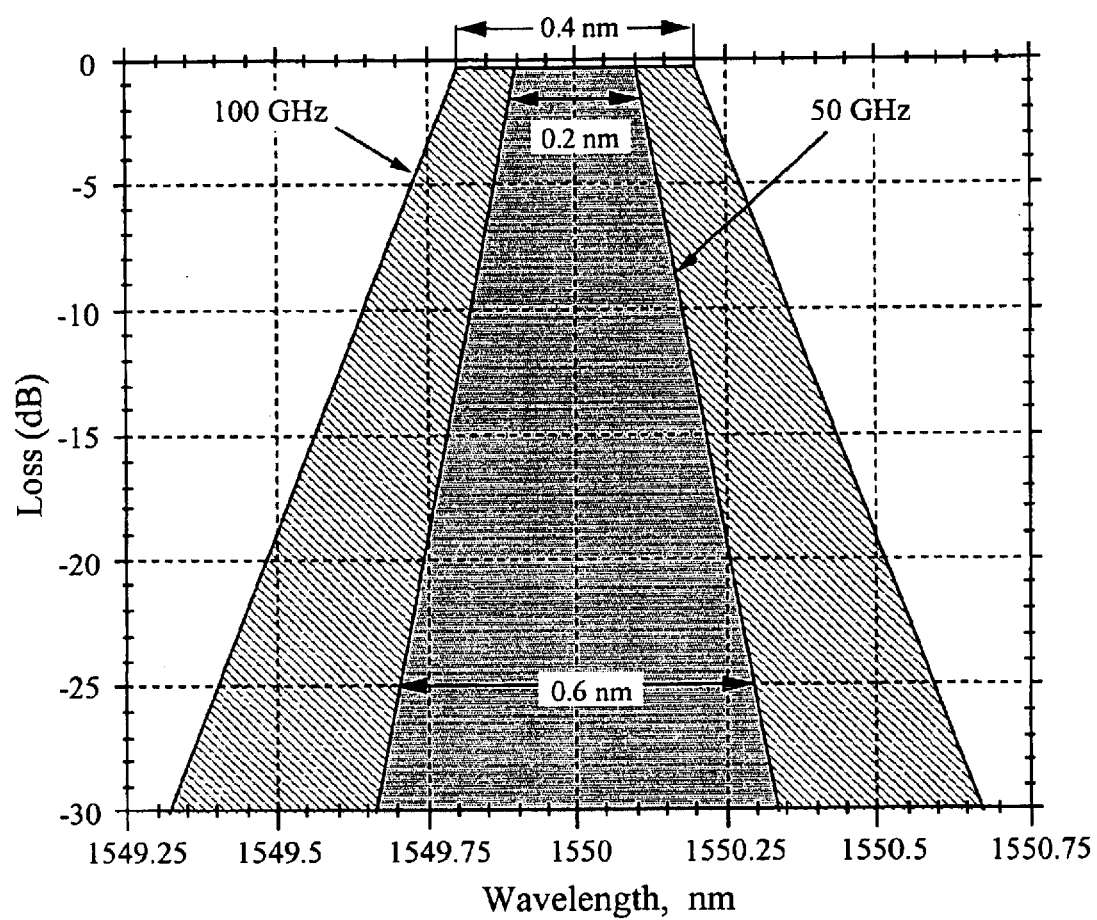
FIG. 1 is a graph illustrating filter profiles of optical filter devices designed for certain telecommunication applications.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a graph illustrating an example of preferred operational characteristics of optical filter devices designed for use in the telecommunication industry. As shown, both 100 Ghz and 50 Ghz filters pass wavelengths centered around 1550 nm (nanometers). Preferably, there is little or no loss of an optical input signal for a range of wavelengths around the center wavelength, near 1550 nm in this example. Such a filter function is known in the art as a "flat top" profile. One reason for the desirability of a "flat top" filter response is to provide enough margin for variation of a laser transmitting at a specified carrier frequency such as 1550 nanometers.

Figure 2:
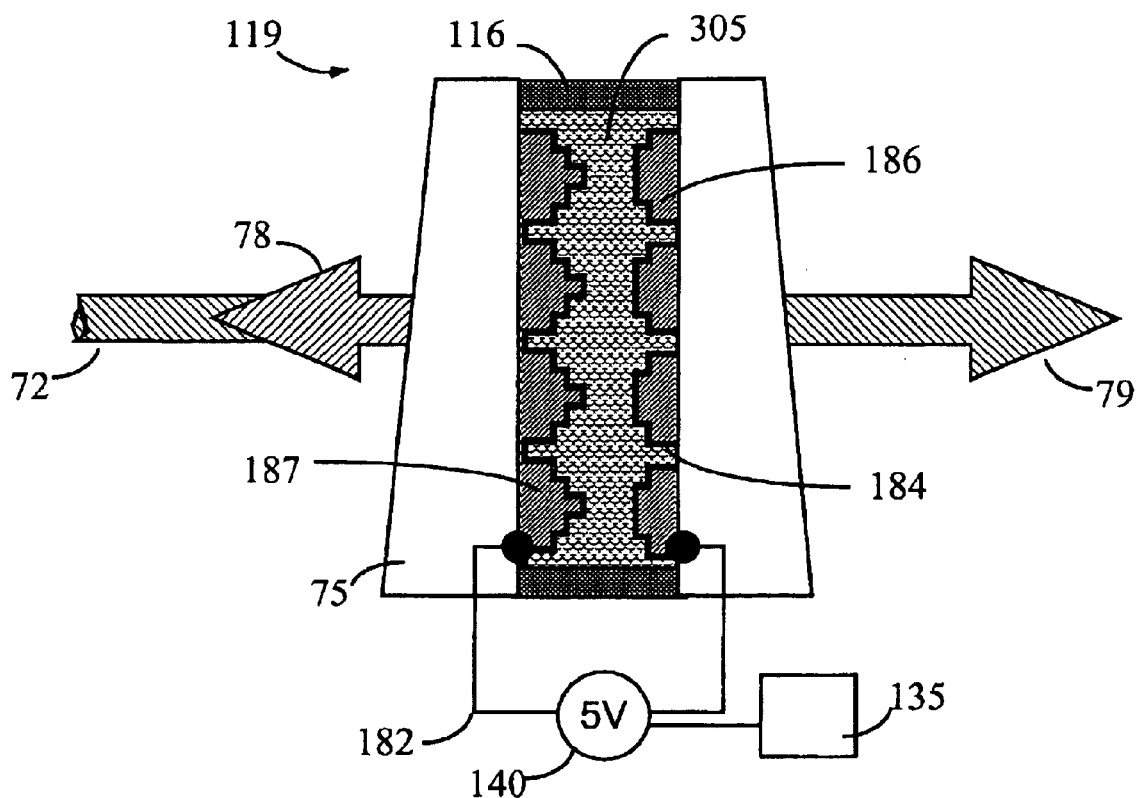
FIG. 2 is a schematic diagram of filter device for tuning incident light according to certain principles of the present invention.

FIG. 2 is a schematic cross-sectional view of an optical device according to certain principles of the present invention. As shown, incident light 72 potentially includes a broad range of wavelengths that are either reflected or transmitted by optical device 119. A distinctive feature of device 119 is resonant cavity 305 formed by two substantially parallel surface textures 186 and 187 described in more detail below in connection with FIG. 3. Surface textures 186 and 187 are separated by spacers 116, and supported by substrates 75 which can be wedged (include non-parallel surfaces) to keep light reflected from external surfaces from entering resonant cavity 305. Alternatively, standard parallel surface substrates can be used when they are treated with an anti-reflecting surface texture such as the structure known as "motheye" in the art.

Because the spacings and dimensions of the features comprising textures 186 and 187 (for example a single step change in depth) are less than the range of wavelengths 72 striking the device, no energy is lost to free-space propagating, higher order diffracted beams. Such textures are known as "sub-wavelength" in the art, and device 119 would be described as a "zero-order" device by those skilled in the art. Because of the sub-wavelength nature of surface textures 186 and 187, a portion of the incident light 72 passes through device 119 unaffected, continuing to propagate as transmitted light 79. However, for a particular composition and configuration of surface textures 186 or 187, a range of wavelengths comprising incident light 72 will resonate within the wave guiding textures and within the cavity 305, producing reflected light 78 propagating at an angle equal to the angle at which incident light 72 strikes device 119 (in this example at zero degrees, or perpendicular to the plane containing the textures). When resonant cavity 305 is filled with an electro-optic material, or when the surface textures 186 or 187 are composed of an electro-optic material, the range of wavelengths which are trapped within the wave guiding surface textures 186 or 187, can be dynamically varied by applying the requisite electric potential 140, between electrically conductive layers 184, via electrical leads 182 and controller 135.

Figure 3:
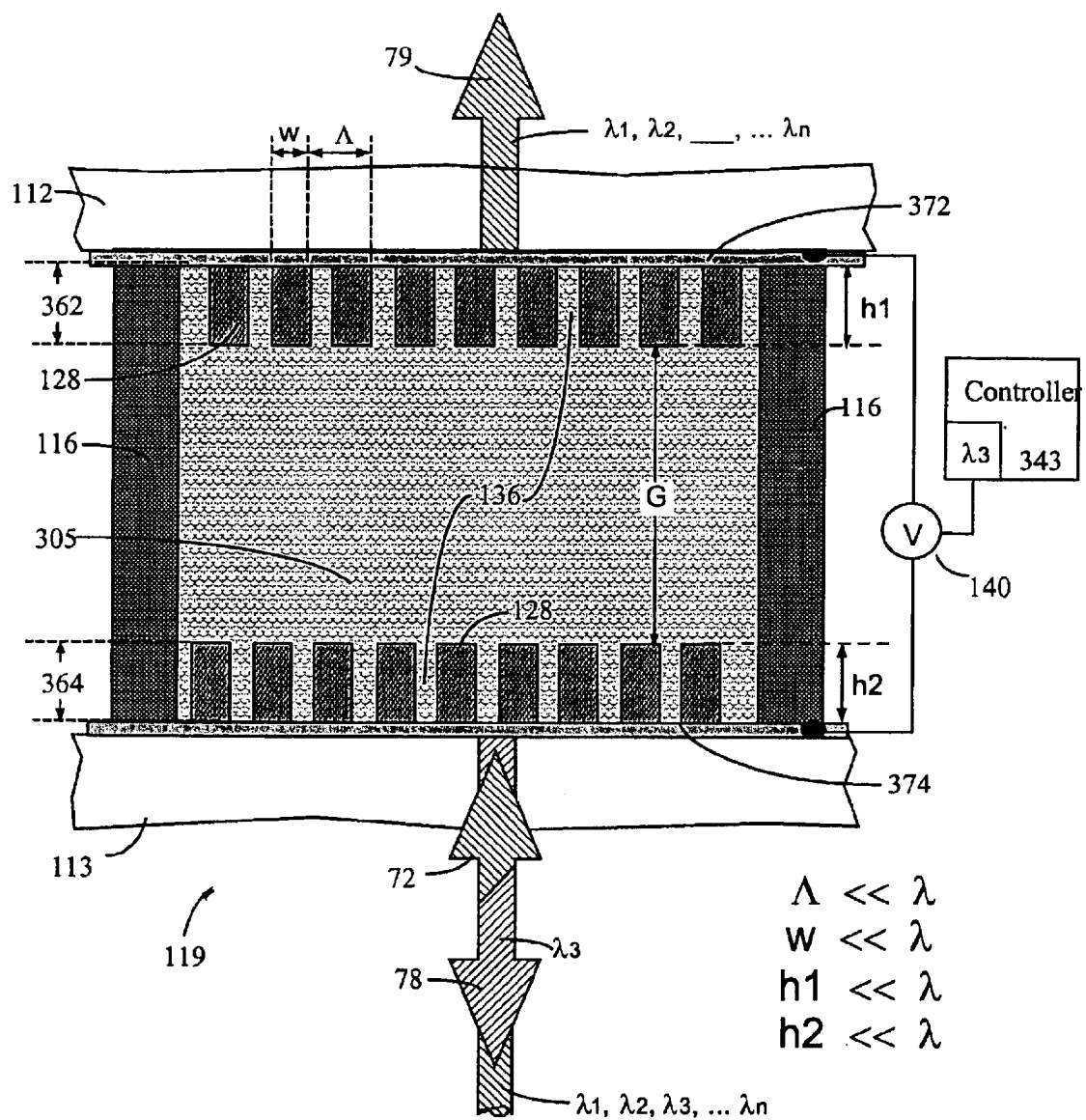
FIG. 3 is a schematic cross-sectional view of an optical device for tuning wavelengths according to certain principles of the present invention.

FIG. 3 is a more detailed cross-sectional view of an optical device according to certain principles of the present invention. During operation, a portion of incident light 72 can be redirected from optical device 119 as reflected light 78 while a portion of incident light can pass through optical device 119 as transmitted light 79. Thus, optical device 119 can be used as an optical filter to transmit or redirect light. This is particularly advantageous in communication systems in which WDM (Wavelength Division Multiplexing) techniques are utilized to pass incident light 72 of a selected wavelength to a selected fiber.

As shown, optical filtering can be achieved by positioning a first substrate 112 and a second substrate 113 with respect to each other. For example, surface textures 362, 364 coupled to respective substrates 112, 113 can be angled or positioned substantially parallel to each other based on an orientation of the first and second substrates 112, 113.

Figure 4A:
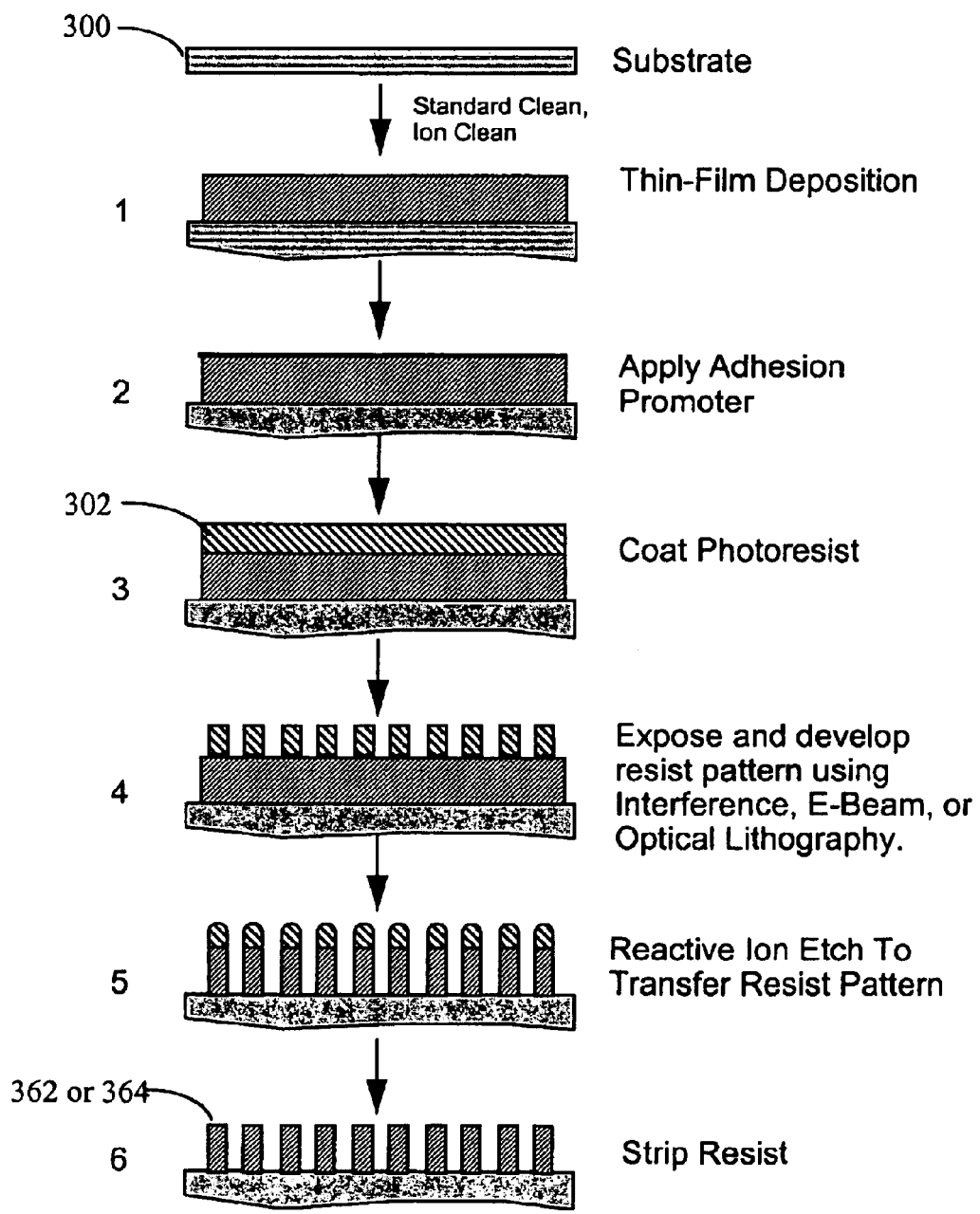
FIG. 4A is a process flow chart of an etching technique for fabricating surface structures according to certain principles of the present invention.
Figure 4B:
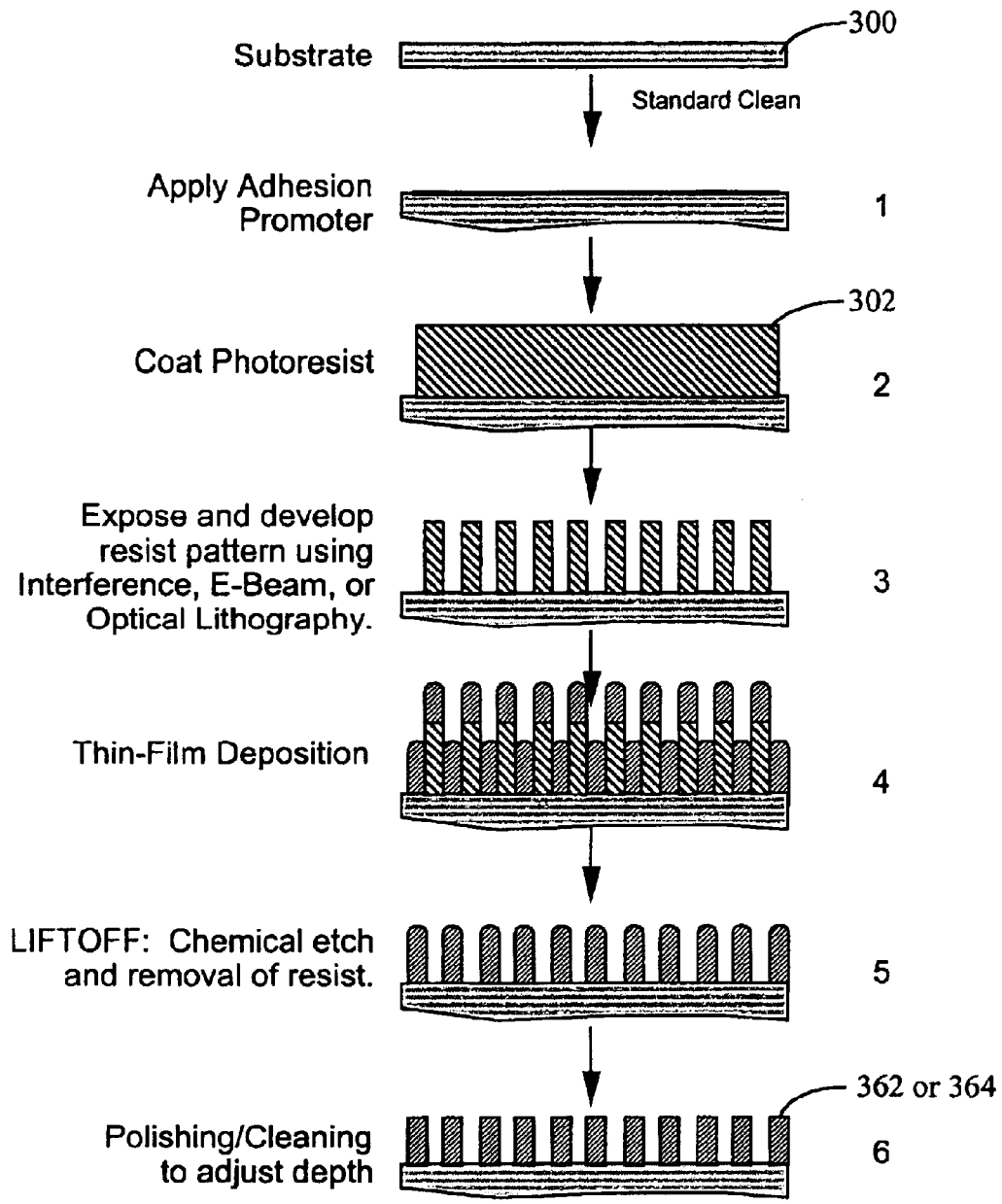
FIG. 4B is a process flow chart of a lift-off technique for fabricating surface structures according to certain principles of the present invention.

Typically, first surface texture 362 and second surface texture 364 are spaced at a distance between 3.0 and 6.0 $\mu$m (micrometers) apart. However, this gap may be smaller or larger depending on the application. Structural support to maintain gap, G, is provided by spacers 116. Surface textures 362, 364 can be a film or layer of material that is deposited on substrate 112, 113 or electrodes layer 372, 374. Specific textures can be formed via an etch process as shown in FIG. 4A, a Liftoff process as shown in FIG. 4B or an embossing process, all of which are known in the art. Also, surface textures 362, or 364 can be formed in substrates 112, or 113.

In one application, there is no gap between surface textures so that a combination of first and second surface textures appear as a single plate. Of course, a single surface texture can be used instead of two surface textures in such an application. Also, surface textures 362 and 364 including depressions, holes, or columns, can line up with each other or be offset relative to each other.

As shown in FIG. 4B, surface textures 362 and 364 can be fabricated on a substrate 300 using interference lithography techniques, embossing, etching, optical lithography, e-beam lithography, or other standard techniques used within the semiconductor or related industry. For example, a surface texture can be formed via a recording layer typically composed of a photosensitive medium known as photoresist 302. A surface pattern is then formed by transferring or copying into another thin film layer.

First surface texture 362 and second surface texture 364 typically absorb little or no optical energy and can be formed from materials such as zinc sulfide, zinc selenide, silicon nitride, titanium oxide, tantalum pentoxide, aluminum oxide, or other suitable material. For tunable devices described herein, an underlying dielectric layer, the device substrate, an over-coated dielectric layer, or the surface texture can be made of a conductive material such as indium oxide, indium tin oxide, tin oxide, or vanadium oxide to allow the requisite electric field to be applied. These materials tend to exhibit low absorption. Suitable substrate materials can include silicon, indium phosphide, gallium arsenide, germanium, zinc sulfide, zinc selenide, and any non-absorbing glass such as fused silica, quartz, or BK7. Other suitable materials can be used in lieu of these materials.

Any suitable dielectric material 136 can be disposed in cavity 305 between first surface texture 362 and second surface texture 364. Dielectric material 136 can also surround individual features 128 comprising surface textures 362 or 364. In a tunable filter application, cavity 305 is filled with a material 136 with an index of refraction that changes depending on an applied condition such as an applied electrical field or temperature change. For example, an electro-optic material such as liquid crystal, polymer-dispersed liquid crystal, lithium niobate (LiNOb3), or polymeric materials having a variable index of refraction whose characteristics change depending on an applied electric field, can be disposed in cavity 305. Alternatively, the surface structures themselves can be formed of an electro-optic material having an adjustable index of refraction.

To create an electric field in cavity 305, a voltage can be applied across first electrode plate 372 and second electrode plate 374 via voltage source 140. Controller 343 drives voltage source 140 to select an electric field strength and, therefore, select the index of refraction of material in cavity 305. A conductive coating is optionally applied to a surface (on an inside wall or surface of cavity 305) such as first surface texture 362 and second surface texture 364 to form electrodes across which a voltage is applied to create an electric field.

In a specific application, the index of refraction of material disposed in cavity 305 varies between 1.45 and 1.75 depending on the applied electric field. However, any suitable material providing a range of indices of refraction can be used.

Alternatively, cavity 305 can be filled with material 136 having a fixed index of refraction. For example, cavity 305 can be filled with material such as air, plastic or other dielectric material. In this instance, optical device 119 can operate as a fixed filter rather than a tunable filter.

When the material in cavity 305 supports a range of indices of refraction, optical device 119 can be used as a tunable filter for selecting which wavelengths of incident light 72 such as $\lambda 1, \lambda 2, \lambda 3, \lambda 4, \ldots \lambda n$ are redirected as reflected light 78 $\lambda 3$ and which wavelengths pass as transmitted light 79 such as $\lambda 1, \lambda 2, _____, \lambda 4, \ldots \lambda n$).

Optical device 119 typically absorbs little, if any, light energy so that incident light 72 is not needlessly attenuated as it either passes through or is reflected by optical device 119. When optical device 119 employs liquid crystal to tune wavelengths of incident light 72, low polarization sensitivity can be achieved by either operating on separate orthogonal polarization states, or by the method of exploiting a polarization independent liquid crystal mode.

As shown in FIG. 3, the index of refraction in cavity 305 is selected so that $\lambda 3$ is reflected from optical device 119 while $\lambda 1, \lambda 2, _____, \lambda 4, \ldots \lambda n$ pass through optical device 119. As discussed, it is preferred that light energy is minimally attenuated. This can be achieved at least in part since optical filter 119 is not polarization dependent. Specific non-absorbing dielectric material (described below) can be used in the fabrication of the optical device 119 so that minimal light energy is absorbed during use.

Dielectric bodies 128 of first surface texture 362 and second surface texture 364 guide wavelengths of light across a gap between the substrates which form a resonant-like cavity 305. During operation, incident light 72 initially passes through transparent substrate 113 to the core optical device 119. Thereafter, the light between substrates is generally guided by bodies or holes 128 of the first surface texture 362, second surface texture 364 and cavity 305 itself so that a portion of incident light 72 is resonantly reflected in cavity 305 and is redirected as reflected light 78 while a portion of incident light 72 passes through optical device 119 as transmitted light 79.

Generally, operational characteristics of optical device 119 depend on a combination of factors such as the index of refraction of the material in cavity 305, the index of refraction and arrangement of the bodies 128 comprising first surface texture 362 and second surface texture 364, and the shape, size and spacing between the bodies 128 of the surface textures. All of these parameters can be adjusted to select which wavelengths of light are transmitted through optical device 119. In addition, the thickness and composition of material layers 372 and 374 adjacent to surface textures 362 and 364, can also be varied to select which wavelengths of light are filtered by optical device 119. Material layers 372 and 374 can be designed to increase the width of the "flat-top" (low-loss pass band) by varying their composition or thickness.

First substrate 112 and second substrate 113 can be formed of transparent non-absorbing material such as glass, which provides structural support for first surface texture 362 and second surface texture 364. In the application as shown, substrates 112 and 113 can have an index of refraction in the range near 1.45 to 1.55 while the bodies 128 such as holes or columns have an index of refraction between 1.7 and 2.2. These values can also vary outside the ranges depending on the application.

Figure 5:
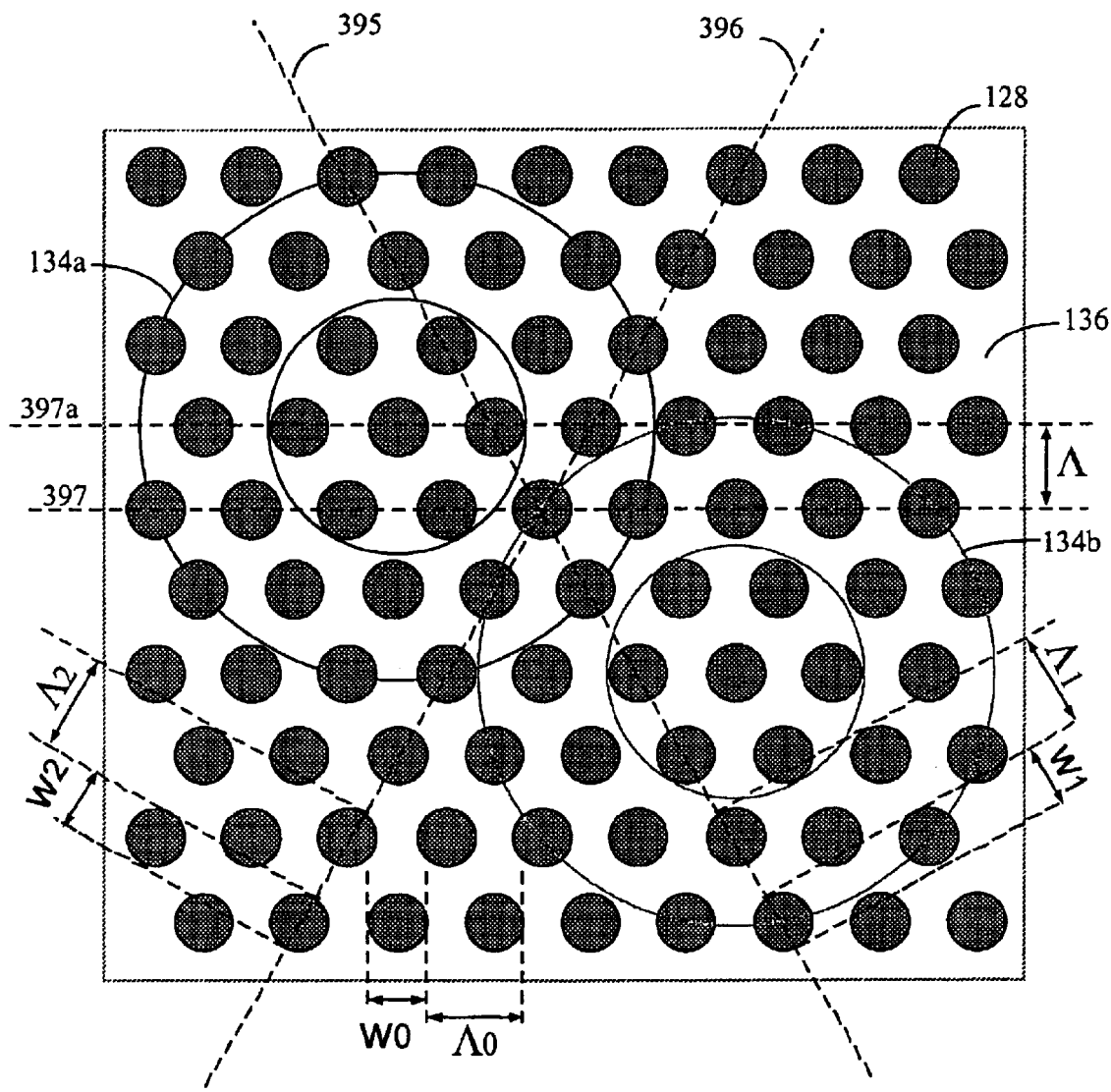
FIG. 5 is a schematic top view of a surface structure of an optical device for tuning wavelengths according to certain principles of the present invention.

As discussed, operational characteristics of optical device 119 depend at least in part on the surface pattern of first and second surface textures, 362 and 364 respectively. FIG. 5 shows an overhead view of device 119 detailing surface texture 362. As shown, a surface texture can include an array of cylindrical bodies 128, each of which has an index of refraction between 1.7 and 2.2. The index of refraction of this material can be any suitable value inside or outside of this range.

Figure 6:
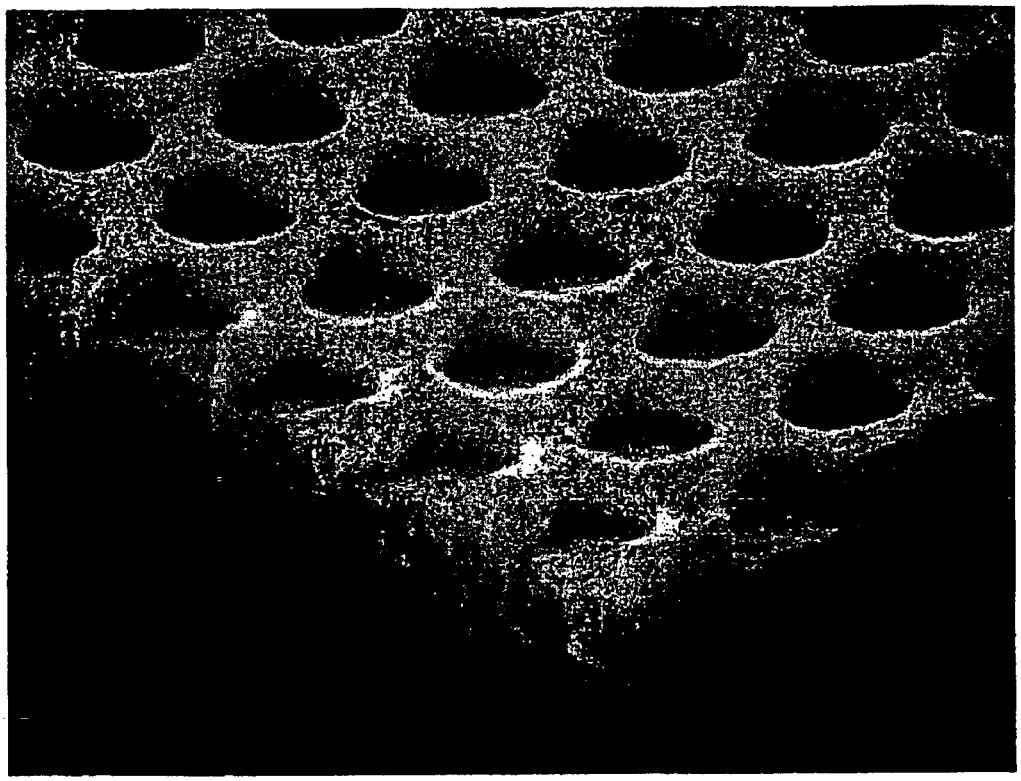
FIG. 6 is a scanning electron microscope photograph of a surface structure according to certain principles of the present invention.

In an alternative embodiment, first surface texture 362 and second surface texture 364 can be fabricated from a solid block, slab, film or layer of material in which cylindrical holes 128 are formed. A scanning electron microscope photograph showing a typical perspective view of layer 362, 364 is shown in FIG. 6, wherein holes 129 are used as the surface texture rather than protrusions. Holes 129 can be filled with a fixed or adjustable dielectric material.

In the application as shown in FIG. 5, holes or cylinders 128 are arranged to form a honeycomb pattern having three equal axes 395, 396 and 397 intersecting at 60 degree angles. Axes 395, 396 and 397 indicate the direction of parallel rows of bodies 128, and illustrate the symmetry of the hexagonal or honeycomb pattern in a transverse direction to incident light 72. Based on use of the honeycomb pattern and its orientation, the state of the optical transverse electric field, known as the polarization of incident light 72, need not be oriented along any particular axis. That is, circular patterns 134a and 134b illustrate locations in which an incident light beam 72 can be directed towards optical device 119. Regardless of a location where incident light strikes a surface of optical device 119, the transverse electric field of incident light 72 encounters a similar cross-sectional pattern. Accordingly, optical device 119 is not necessarily polarization dependent.

A notable feature of surface textures 362 and 364 is the polarization independence associated with the symmetry of the honeycomb pattern. As shown, there are three axes along which an incident light 72 propagating in a direction substantially perpendicular to the plane of the array of bodies 128, will encounter an identical cross section. Because of the circular symmetry created by the relative locations of each body 128 (hole or column) in the array, and because the pattern pitch is identical on each of three axes spaced 120 degrees apart, ensuing resonance of light energy in cavity 305 is unaffected by the orientation of the electric field, i.e., polarization of the incident light. This polarization independence is unique to this type of hexagonal or honeycomb grating structure, and can be beneficial for use in telecom and sensor applications. Notice also that a honeycomb array according to the principles of the present invention has a high degree of circular symmetry regardless of where an optical beam is incident to the array, as indicated by circles 134a and 134b. (Perfect circular symmetry would be a series of concentric rings—but these rings have a well defined center and so are not practical for a telecom device which can have an optical beam incident off the center)

In a specific application, optical device 119 is used to redirect wavelengths, λ, in the L-band between 1.570 and 1.605 micrometers. The height, h, of the surface textures is in the range of 1 to 1.1 micrometers, while the spacing between dielectric bodies in the surface textures, Λ, is in the range of 0.9 to 1.1 micrometers, and the cross sectional width of the dielectric bodies, w, is in the range between 0.5 to 0.7 micrometers. Based on these parameters, a duty cycle or ratio of w to Λ is 60%. Relative dimensions of the optical structure are generally small compared to a bandwidth of light upon which optical device 119 operates. For example, any or all of these dimensions as previously mentioned can be smaller than a wavelength of light that is tuned as reflected light 78.

Parameters such as the size and spacing between surface structures can be adjusted to tune wavelengths in other bands such as the telecommunications S-band (1480–1520 nanometer), C-band (1520–1570 nanometer), or cable television bands (800–900 nanometer), or any other range of wavelengths. The period of the structures is directly related to the resonant wavelength; increasing the height of the structures generally shifts the resonant wavelength to longer wavelengths. Duty cycle variations of the structures can also be used to fine tune the resonant wavelength. These parameters also impact the shape of the resonance —e.g., how wide the flat-top is and the amount of cross-talk (energy outside the pass band). Thus, theoretical models and product parameter variation are used to simultaneously develop products with wide pass-bands at the desired wavelength, along with good isolation characteristics.

Figure 7:
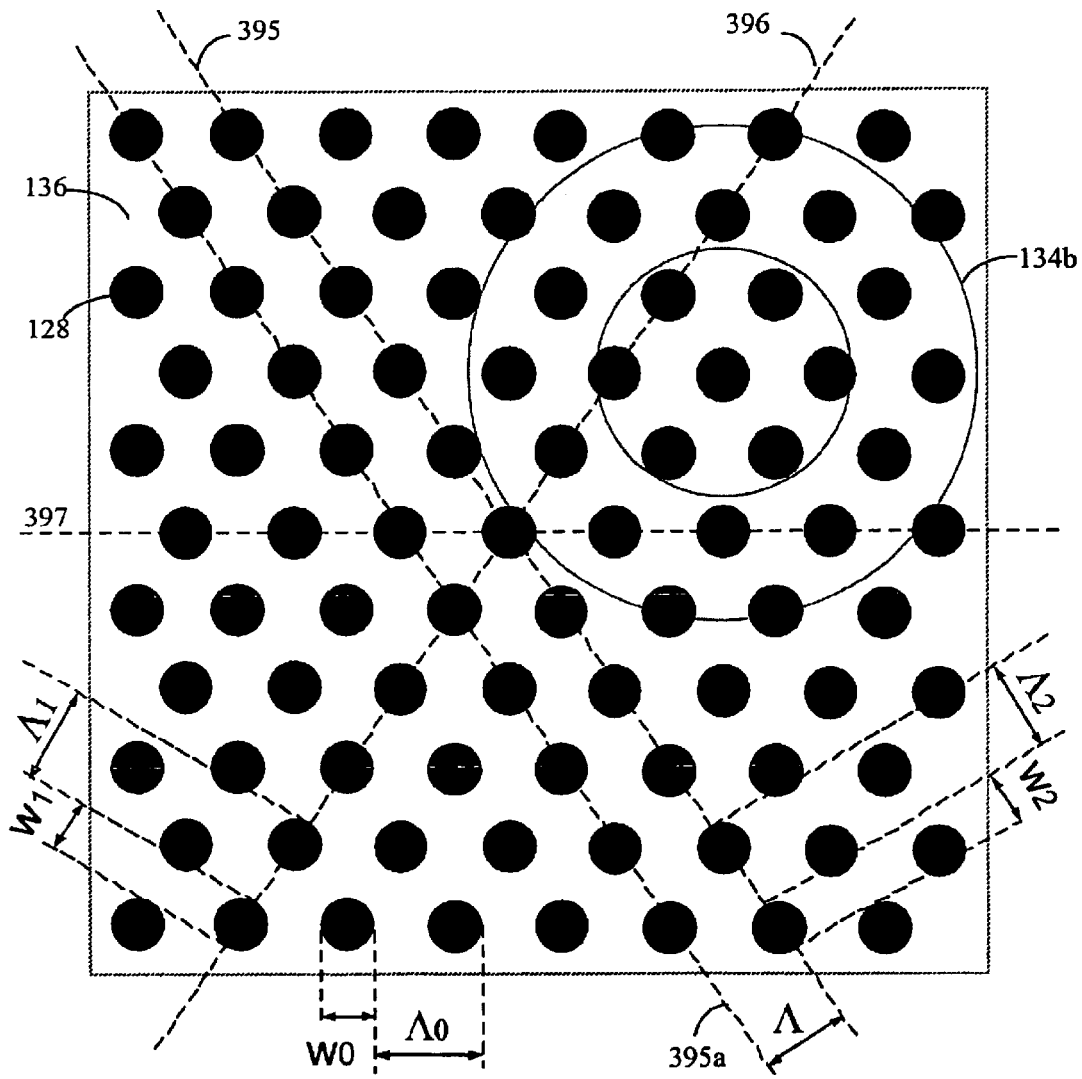
FIG. 7 is a schematic top view of a surface structure of an optical device for filtering wavelengths according to certain principles of the present invention.

FIG. 7 is a top view of an alternate surface texture according to certain principles of the present invention. As shown, a pitch, or spacing between holes or cylinders 128 comprising a single surface texture such as 362 or 364, can be varied to provide a flat top filter response around a selected center frequency, without cavity 305. For example, multiple resonances of incident light 72 along axes 395, 396, and 397, can be slightly shifted due to variations in the spacings between dielectric bodies or holes 128. Such asymmetries in the surface pattern of first surface texture 362 and/or a second surface texture 364, produce an overall output of optical device 119 that includes multiple superimposed resonances. A combination of three slightly shifted resonances along 3 axes of optical device 119 can produce a flat top filter response similar to that shown in FIG. 1. This variation in spacing will lead to a reduction of the circular symmetry needed for polarization independence. An optimized flat top response is produced by minimizing the dielectric body pitch variation in each surface texture 362 and 364, while effecting a rotation of texture 362 relative to texture 364 in a two surface texture embodiment such as device 119 of FIG. 3. For the honeycomb patterns illustrated in FIGS. 5, 6, and 7, the maximum rotation between axes in textures 362 and 364 is 30 degrees.

Producing a flat top response can also be achieved in a two surface texture device by having a slightly different pitch (distance between dielectric bodies) on the first surface texture 362 than second surface texture 364.

Another method for adjusting or broadening a flat top response of optical device 119 is to change the duty cycle (i.e., the ratio of the width along one axis of the dielectric bodies to the spacing between bodies) in the first surface texture 362 with respect to the second surface texture 364. For example, the cylinder bodies shown in surface texture 362 of FIG. 3 can have a larger diameter than the bodies in surface texture 364.

Figure 8:
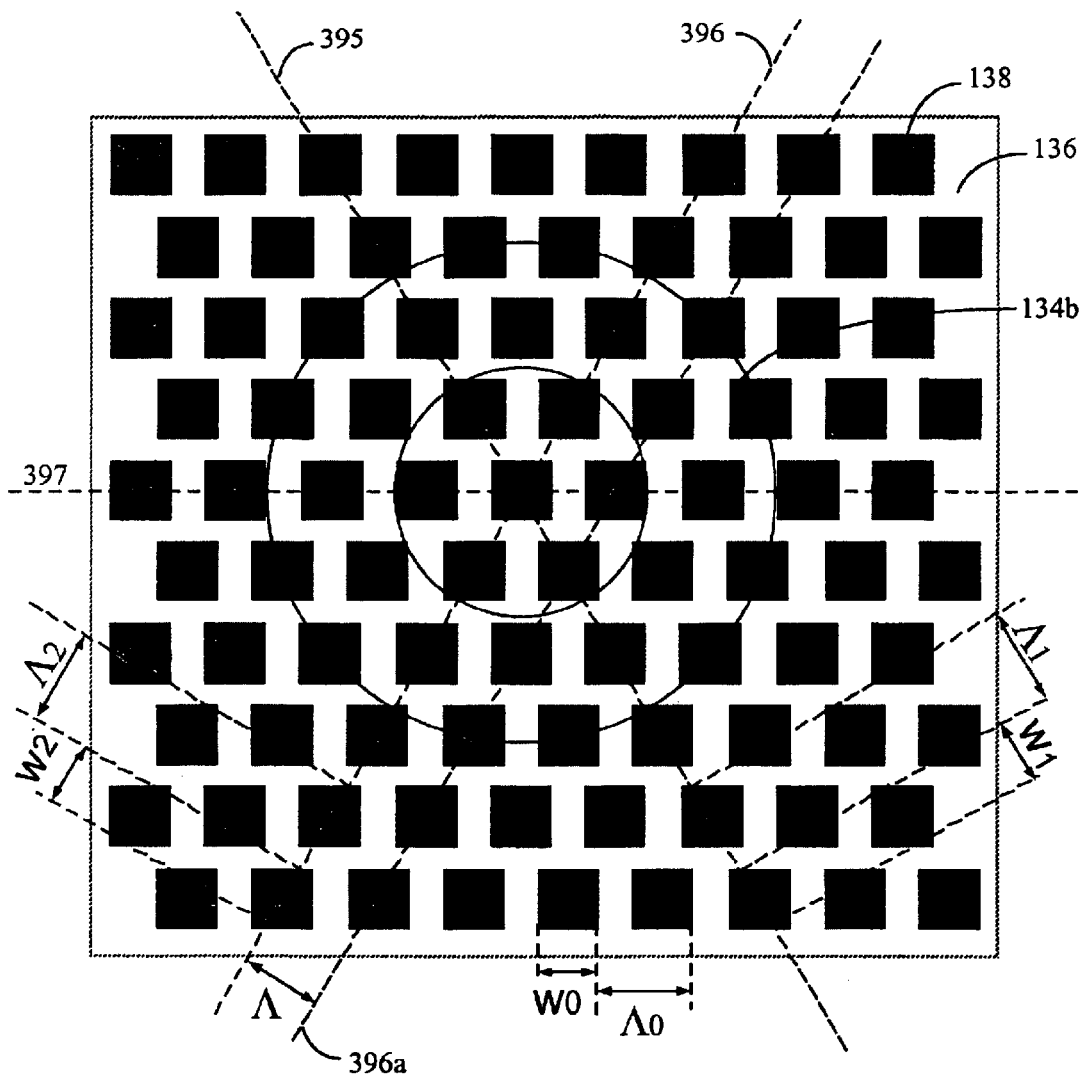
FIG. 8 is a schematic top view of a surface structure of an optical device for filtering wavelengths according to certain principles of the present invention.

Alternatively, the duty cycle can be varied along separate axes of the same surface texture 362 or 364, by a change in the cross-section of the dielectric bodies as shown in FIG. 8. The surface texture of FIG. 8 contains an array of square columns 138 surrounded by fill material 136, as opposed to the circular columns 128 shown in FIG. 5. The square columns in the honeycomb array are equally spaced along axes 395, 396, and 397, however axis 397 indicates a cross section with a duty cycle smaller than axes 395 and 396. By varying the shape of the dielectric bodies or holes 138, the width of the flat top pass band can be optimized while maintaining the circular symmetry 134b, needed for polarization independence.

Figure 9:
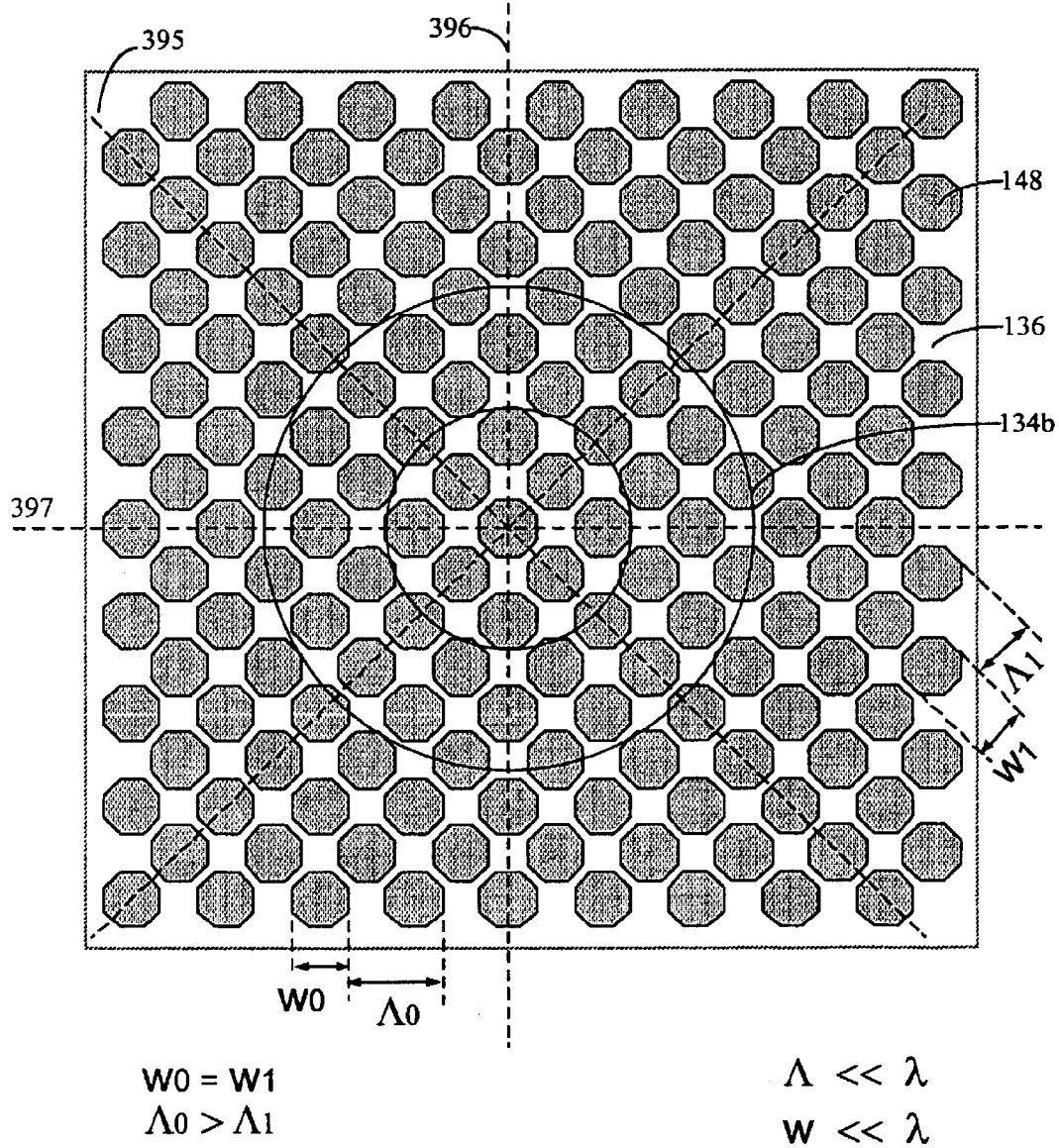
FIG. 9 is a schematic top view of a surface structure of an optical device for filtering wavelengths according to certain principles of the present invention.

Note that as shown in FIG. 9, the circular symmetry is greatly reduced for an arrangement of dielectric bodies 148, located at the corners of a square as opposed to the hexagonal grid in FIGS. 5 through 8. Such a square grid pattern can serve to broaden the pass band of the filter but at the expense of a greater polarization dependence. This is illustrated in FIG. 9 where only two axes 396, 397 have equal cross sections, and axis 395 indicates a cross section with a large difference in pitch and duty cycle.

Another method for adjusting or broadening a flat top response is to change the gap, G, between the surface textures 362, 364.

Lastly, the heights h1 and h2 of the dielectric bodies in surface textures 362 and 364 shown in FIG. 3, can be varied to produce a broadening of the filter pass band. Any combination of the variations illustrated in FIGS. 3, 5–9, and other methods can be used to adjust the filter response of optical device 119.

Angle tuning can be used to set the desired center wavelength. For example, first surface texture 362 can be angled relative to second surface texture 364 (so that the layers are not precisely parallel), or the entire device 119 can be angled relative to the incident light 72 direction. Unique to this technology is the ability to operate the filter at an incidence angle significantly off the normal without an impact on the polarization state (no mode splitting). This technique supports an Add/Drop configuration of wavelengths and eliminates the need for optical circulators to separate counter-propagating incident 72 and filtered 78 beams. Potentially infinite isolation can be achieved between Add and Drop channels that are processed by physically separate sections of the device's aperture.

Figure 10:
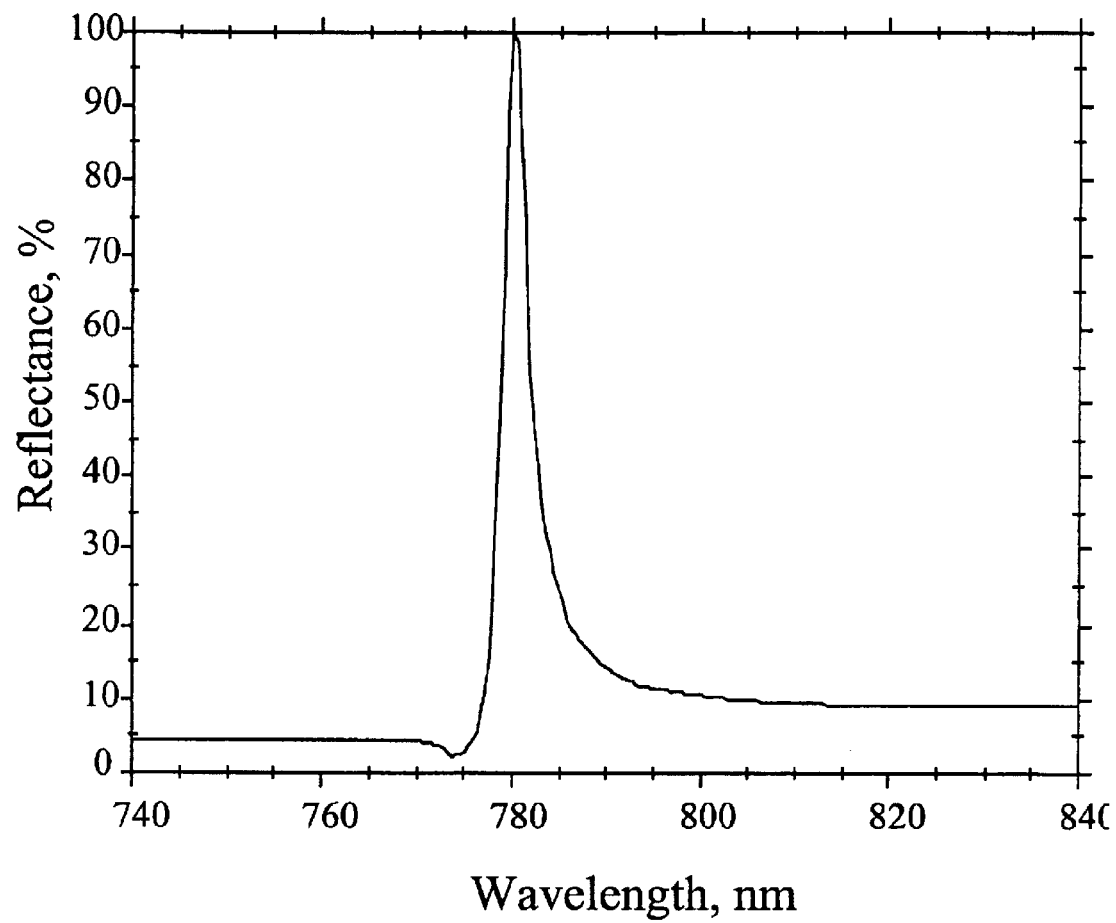
FIG. 10 is a graph illustrating a resonance of a band-pass of wavelengths from an optical filter device according to certain principles of the present invention.

FIG. 10 is a graph illustrating the results of a simulation of a single guided-mode surface structure resonance filter designed for chemical or biological sensing applications. As shown, a high percentage of incident light 72 centered on a 780 nanometer wavelength is redirected as reflected light 78 from just a single surface texture 362 of optical device 119. Incident light 72 at other wavelengths such as above 800 nanometers and less than 775 nanometers mainly passes through optical device 119 as transmitted light 79. As discussed, parameters of optical device 119 can be adjusted to tune different ranges of incident light 72.

Figure 11:
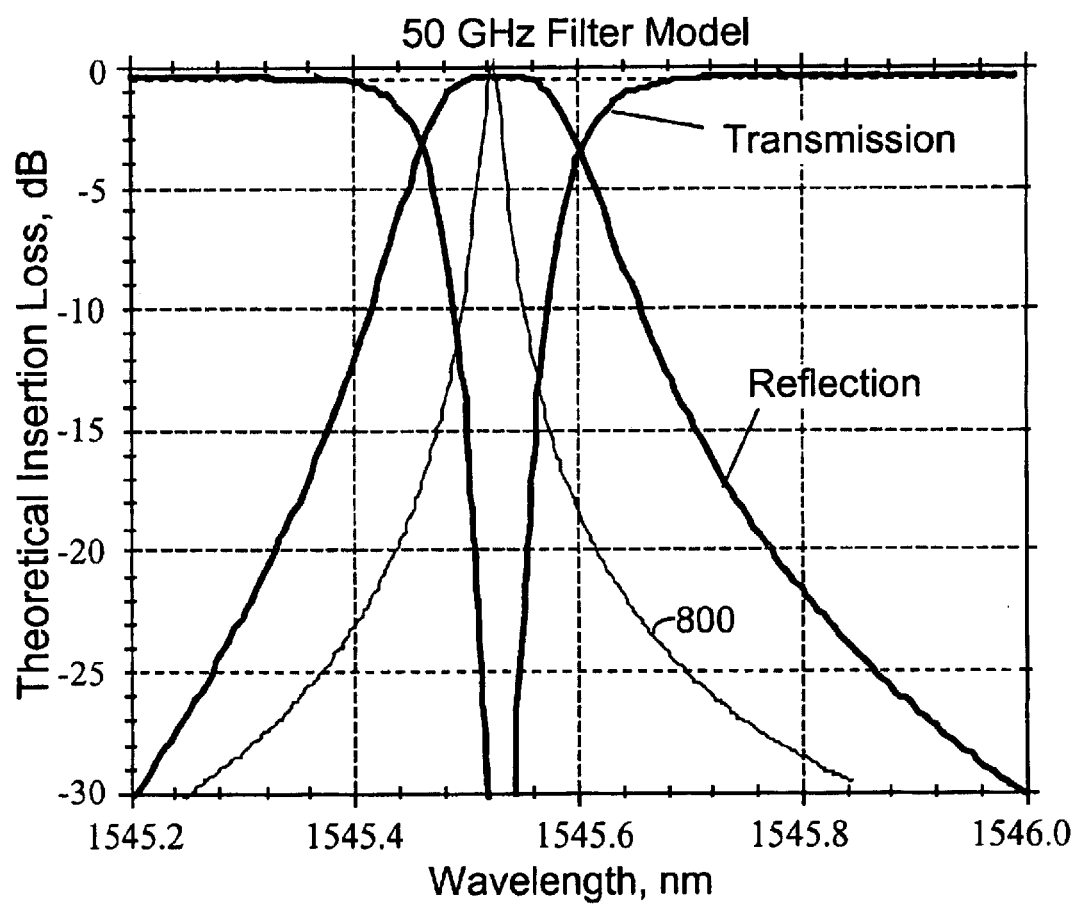
FIG. 11 is a detailed graph illustrating the reflection of light from and transmission of light through an optical filter device according to certain principles of the present invention.

FIG. 11 is a graph illustrating a theoretical pass band filter centered around 1545.5 nanometers according to certain principles of the present invention. As shown, a filter response of optical device 119 exhibits an acceptable passband width at −0.5 dB loss, and a channel width at −30 dB below the peak reflection corresponding to a 50 GHz filter for telecommunication applications. In this model, the flat pass band was achieved by modeling a difference in height h1 and h2, of the dielectric bodies in the two surface textures 362 and 364. This serves to de-tune each resonant surface structure such that after modulation by the resonant cavity, two slightly offset center wavelength resonances overlap to form the flat top response. Also in the figure is a plot of a single surface texture 362 or 364 resonance (curve 800) without the benefit of the resonant cavity. Such a narrow pass band is unacceptable for some telecommunications applications, but could be useful for some applications such as a wavelength selective mirror for fixed and tunable lasers, for network channel power monitoring, or for test and measurement applications.

Figure 12:
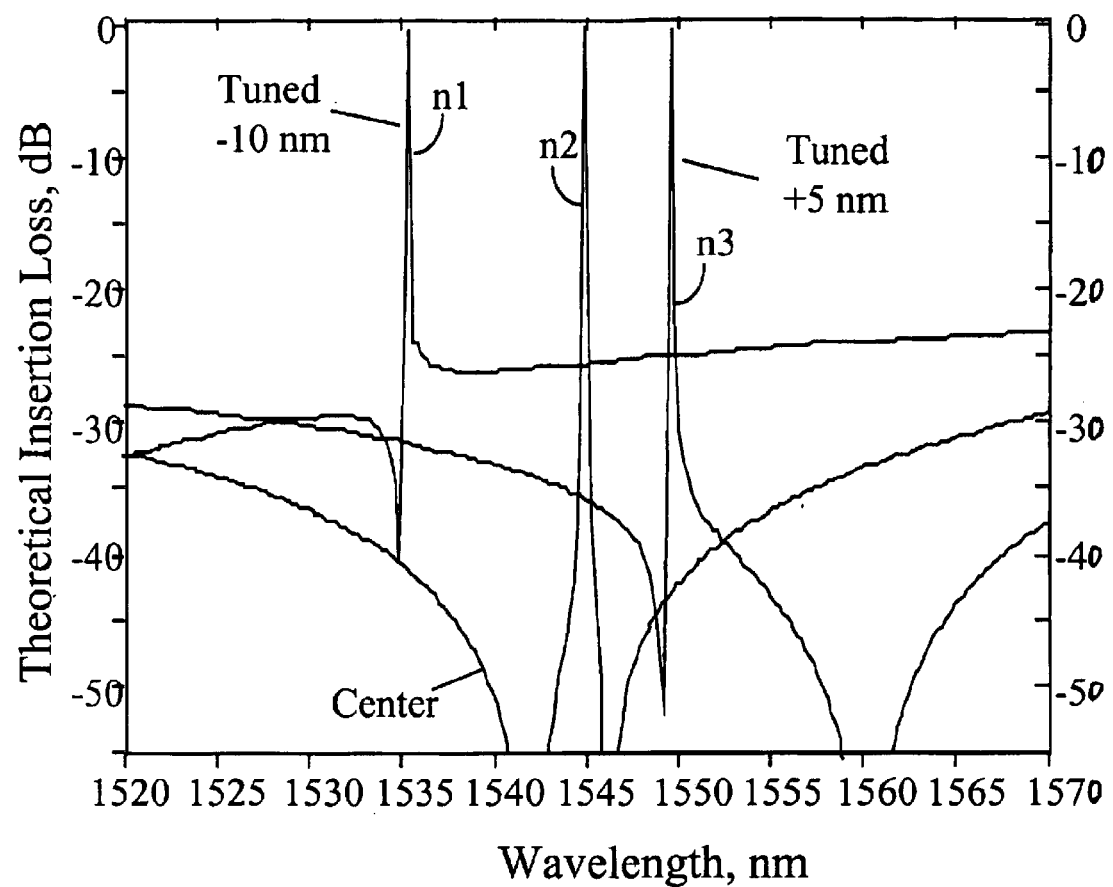
FIG. 12 illustrates a graph of band-pass characteristics of an optical filter device when tuned according to certain principles of the present invention.

FIG. 12 illustrates different characteristics of optical device 119 for different indexes of refraction of material disposed in cavity 305. As shown, a loss is plotted for a range of wavelengths for a selected index of refraction in cavity 305 of optical device 119. Consequently, dynamic tuning of optical device 119 can be achieved by adjusting or selecting an index of refraction in cavity 305. Similar results would be found for a model where the optical index of refraction for the cavity 305 is held constant and the refractive index of the surface texture is varied. The plot shows three curves n1, n2, and n3 resulting from simulations of three states of device 119. Curve n2 was generated using device parameters optimized for a resonant wavelength at 1545 nanometers near the center of the telecommunications C-Band. The filter pass band corresponds to a telecom standard of 50 GHz. Curves n1 and n3 were generated by increasing and decreasing the refractive index of the material filling cavity 305. The center wavelength of the filter shifts more than 15 nanometers for a change in refractive index of less than 0.04. Alternate material groups comprising device 119 can yield a range of over 100 nanometers for a refractive index change of 0.1.

Figure 13:
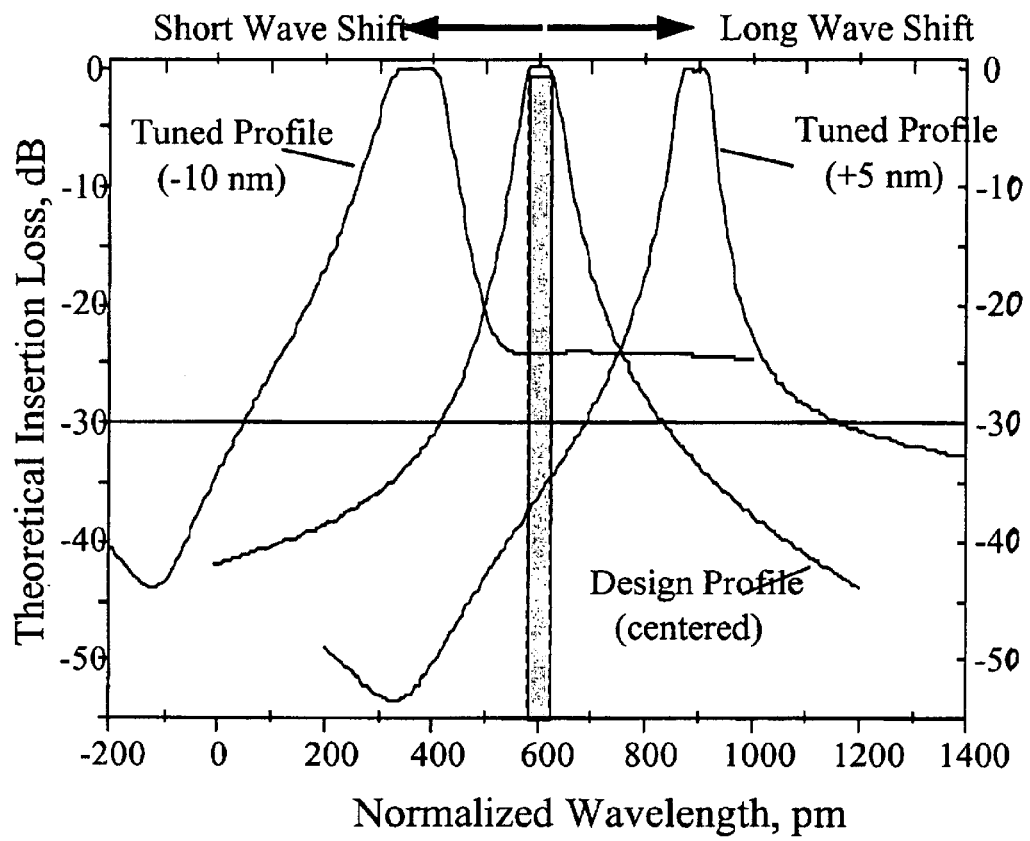
FIG. 13 a high wavelength resolution plot depicting band-pass characteristics of an optical filter device when tuned according to certain principles of the present invention.

FIG. 13 shows the same three curves as in FIG. 11 plotted with high wavelength resolution to illustrate the effect on the filter profile when the device is tuned. By varying the materials employed and the surface texture parameters such as pitch and depth, the filter profile produced with a tunable device can be adjusted to match the application. For example, a tunable filter for WDM network receivers requires a constant filter profile, whereas an Add/Drop multiplexer might require the filter shape to vary significantly to equalize the power in various wavelength ranges, or to add or drop more than one channel.

In practice a semiconductor material can change its optical index of refraction as a function of electrical current flow, or a polymer dispersed liquid crystal (PDLC) can be used to form a surface texture with a variable index of refraction. Similarly, a piezoelectric material (that changes shape upon application of voltage) may be used as the surface texture to dynamically tune the device via a change in the pattern duty cycle.

Figure 14:
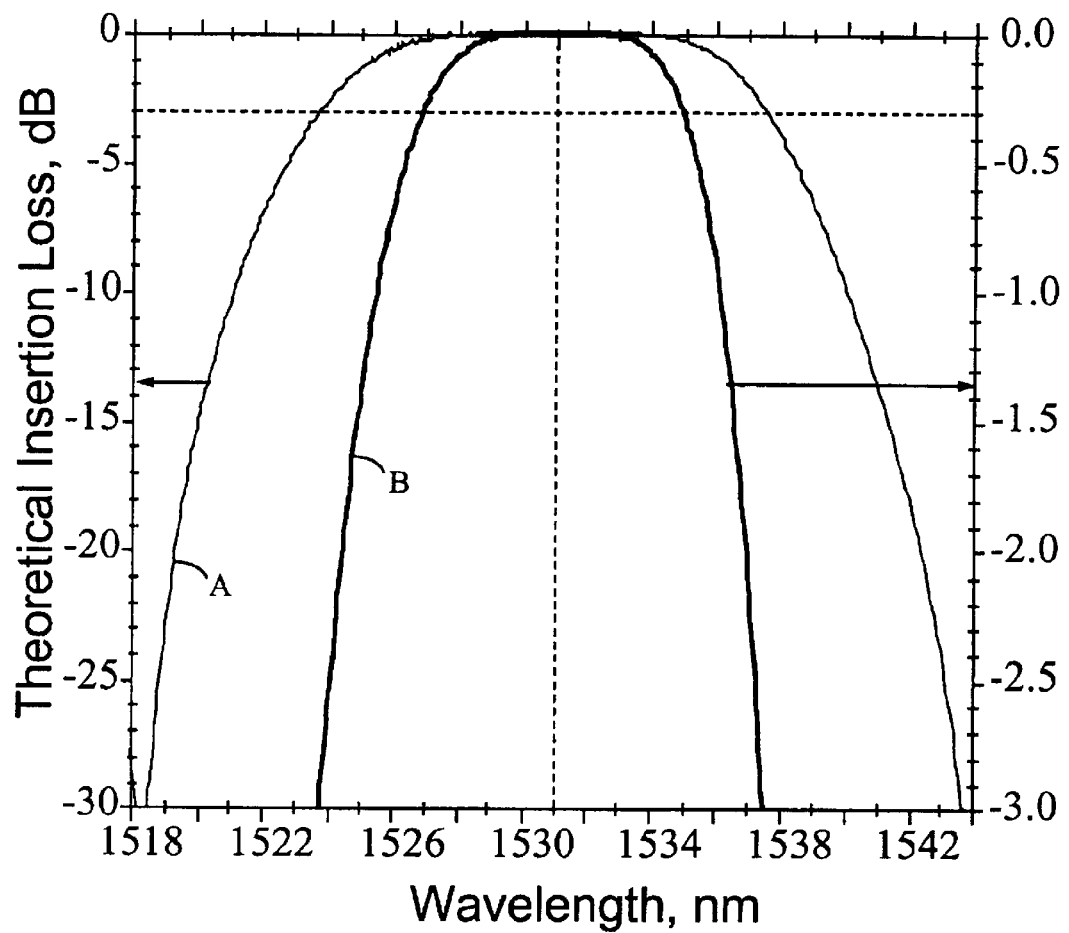
FIG. 14 is a graph illustrating a flat top response of an optical filter device according to certain principles of the present invention.

FIG. 14 is a graph illustrating a pass band filter centered around 1531 nanometers according to certain principles of the present invention. Curve A and curve B illustrate the same filter response of an optical device. However, curve A is drawn relative to the scale on the left axis while curve B is drawn relative to the scale on the right axis. As shown, a filter response of optical device 119 exhibits an acceptable pass band width at 0.5 dB, and a channel width at −30 dB below the peak reflection corresponding to a coarse filter for wide-channel-spacing WDM telecommunication applications.

Although one preferred embodiment shown in FIG. 3 illustrates a use of two surface textures, namely first surface texture 362 and second surface texture 364, any number of surface textures can be used in optical device 119. Typically, a higher number of parallel surface textures used in optical device 119 results in a more rectangular filter response. (A single surface texture can also be used. Also, first and second electrodes 372, 374 can be applied along a different axis than shown.)

Figure 15A:
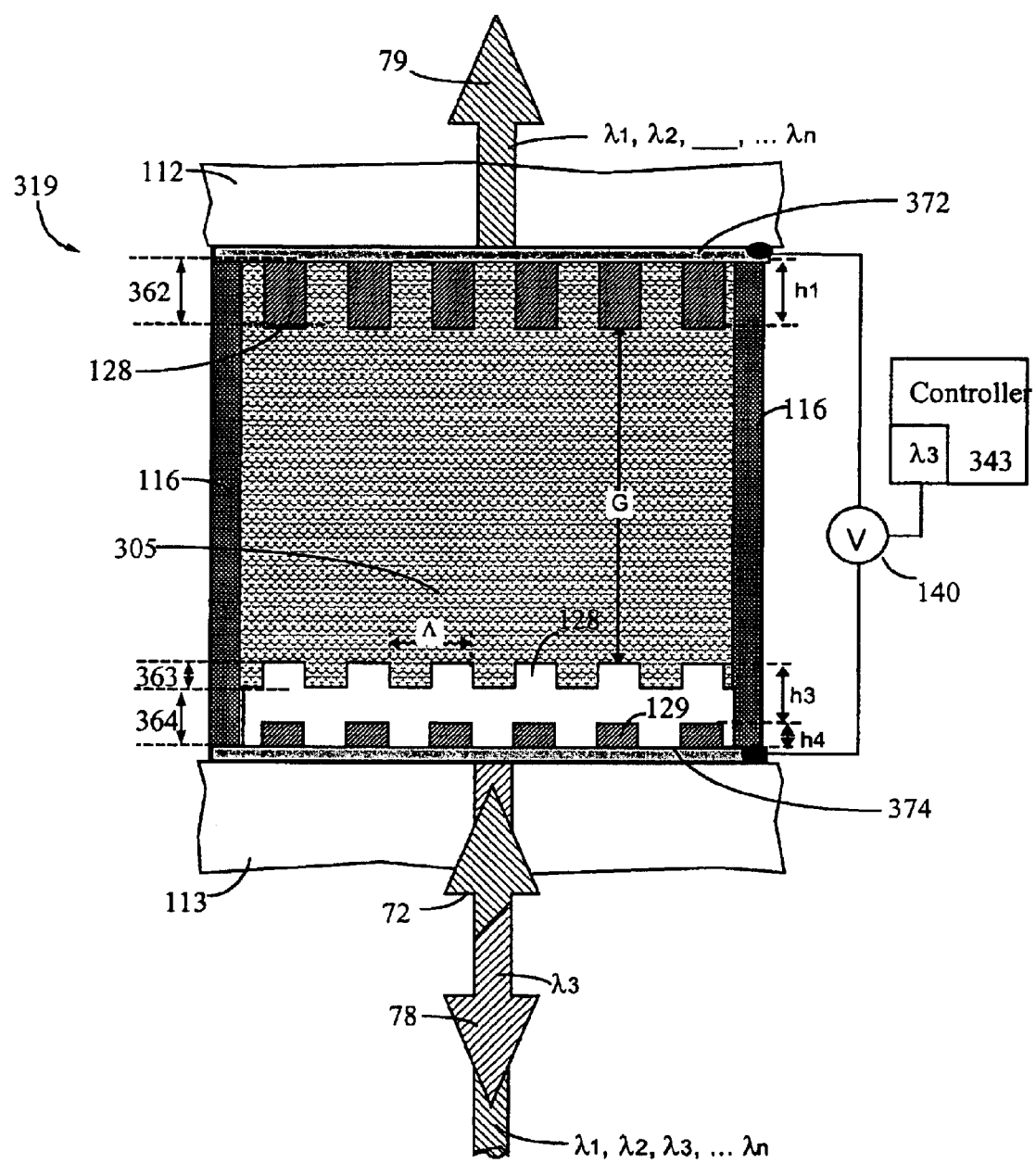
FIGS. 15a and 15b are schematic cross sectional views of three and four surface structure waveguide optical filters according to certain principles of the present invention.

FIG. 15A illustrates optical filter device 319 utilizing three wave guiding surface textures, 362, 363, and 364 comprised of multiple dielectric bodies 128, 129.

Figure 15B:
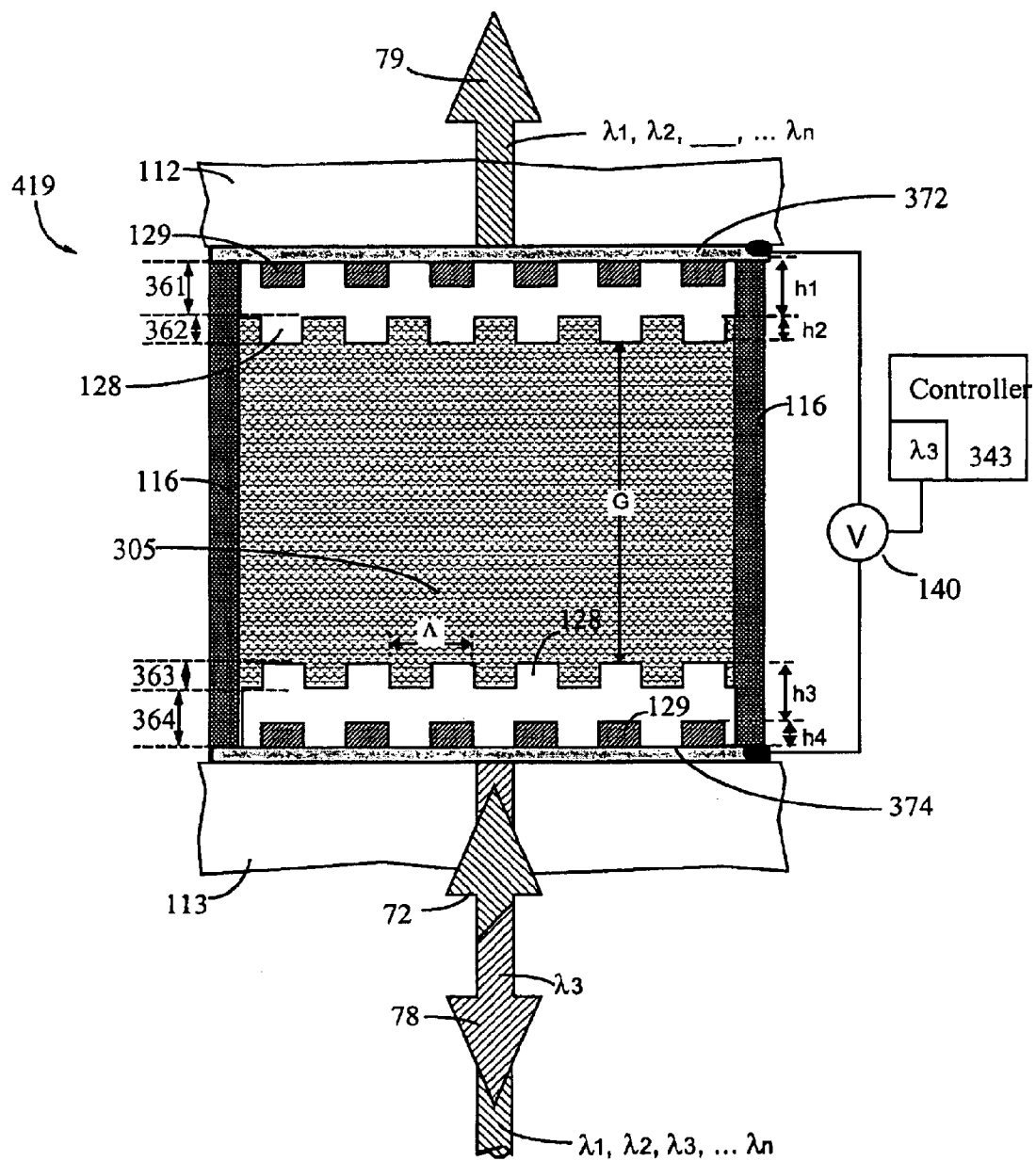

FIG. 15B illustrates optical filter device 419 utilizing four wave guiding surface textures, 361, 362, 363, and 364 comprised of multiple dielectric bodies 128, 129.

Figure 15C:
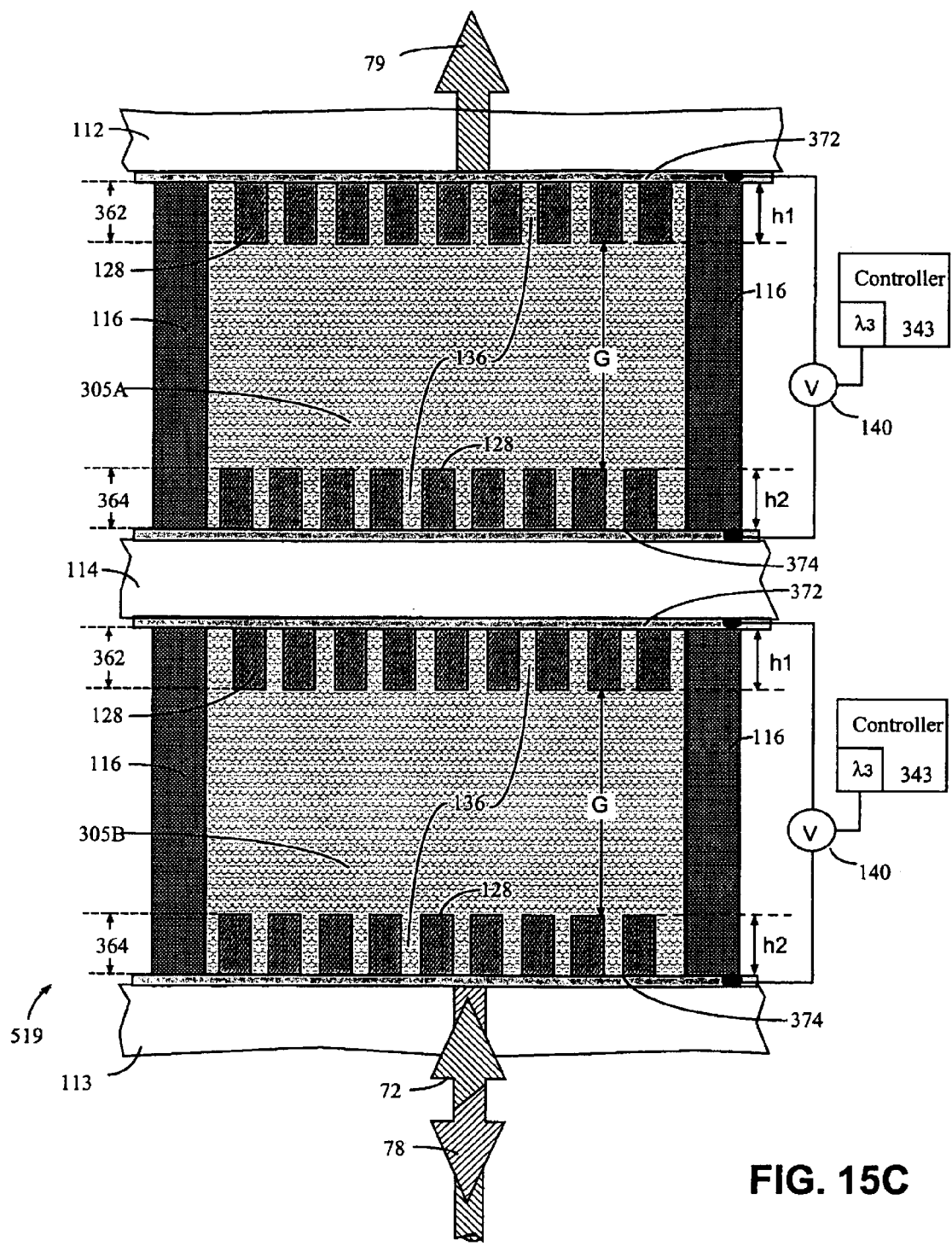
FIG. 15c is a schematic cross sectional view of a four surface structure waveguide, two cavity optical filter according to certain principles of the present invention.

FIG. 15C illustrates optical filter device 519 utilizing four wave guiding surface textures grouped in two resonant cavities 305A and 305B. Three substrates 112, 113, and 114 provide support for the four surface textures.

The ideal flat top behavior is closely approximated with a resonant cavity as described above, with the coupling surface texture and wave guiding layer on each side of the cavity, where variation in the resonant shape is done by varying the pitches, duty cycles, and thicknesses of the bodies comprising the surface textures. Furthermore, the addition of a third or fourth surface texture improves the flat top behavior significantly, with parameter values exceeding typical specifications as shown in FIG. 1. The reason for this behavior is similar to that of thin film technology, where an improved sidewall slope of the resonance depends directly on the number of cavities in the thin film assembly. In this case the number of surface textures is analogous to the number of cavities. The advantage of the system described here, utilizing multiple surface textures, is the great reduction in the total number of layers in the system in comparison to the typical thin film filter, that utilizes multiple dielectric layers in conjunction with the cavities.

Figure 16:
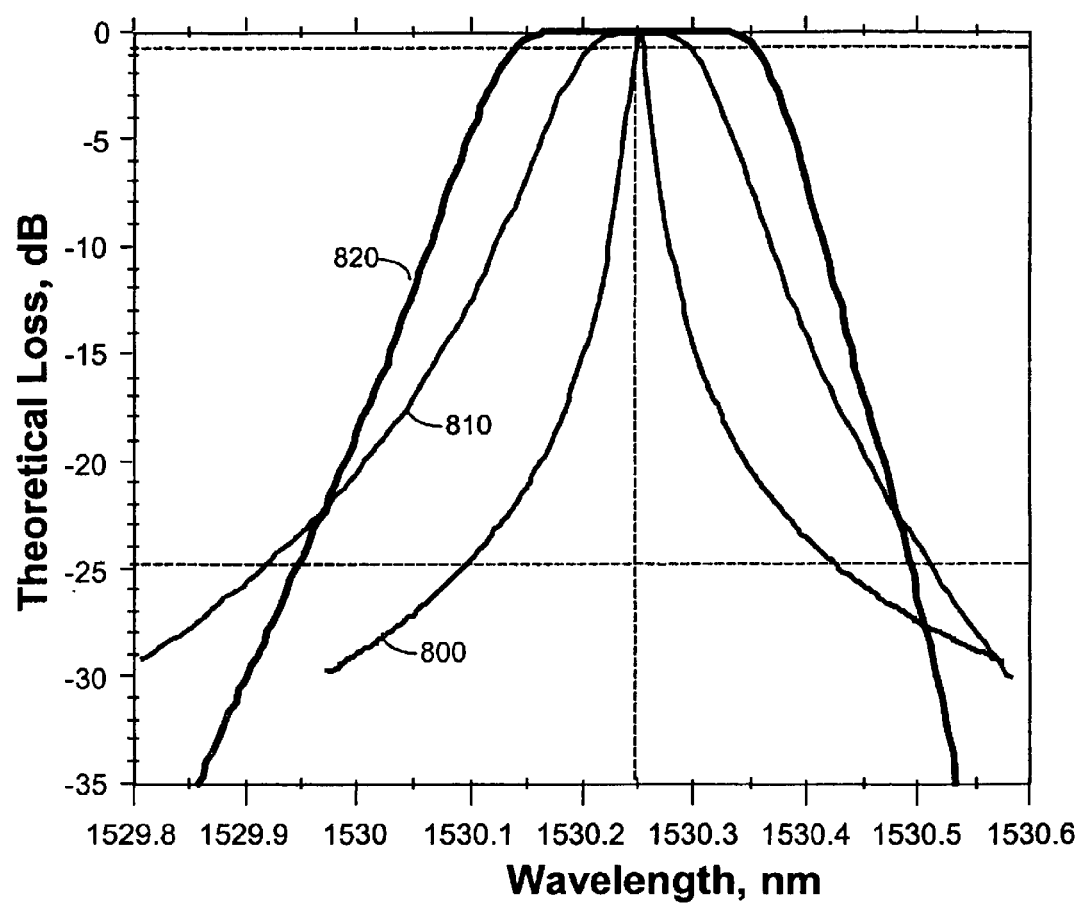
FIG. 16 is a graph illustrating the theoretical transmission and reflection of light from surface structure optical filters constructed without a resonant cavity, one and two resonant cavities.

FIG. 16 is a graph showing three curves, 800, 810, and 820 resulting from a simulation of device 119 with a single surface texture 362 (curve 800), device 119 with two surface textures 362, 364 (curve 810), and device 519 with four surface textures in two cascaded resonant cavities (curve 820). A significant increase in the width of the pass band is realized using the multiple surface texture, multiple cavity device 519. Further increases in pass band width can be obtained with additional cavities.

Figure 17A:
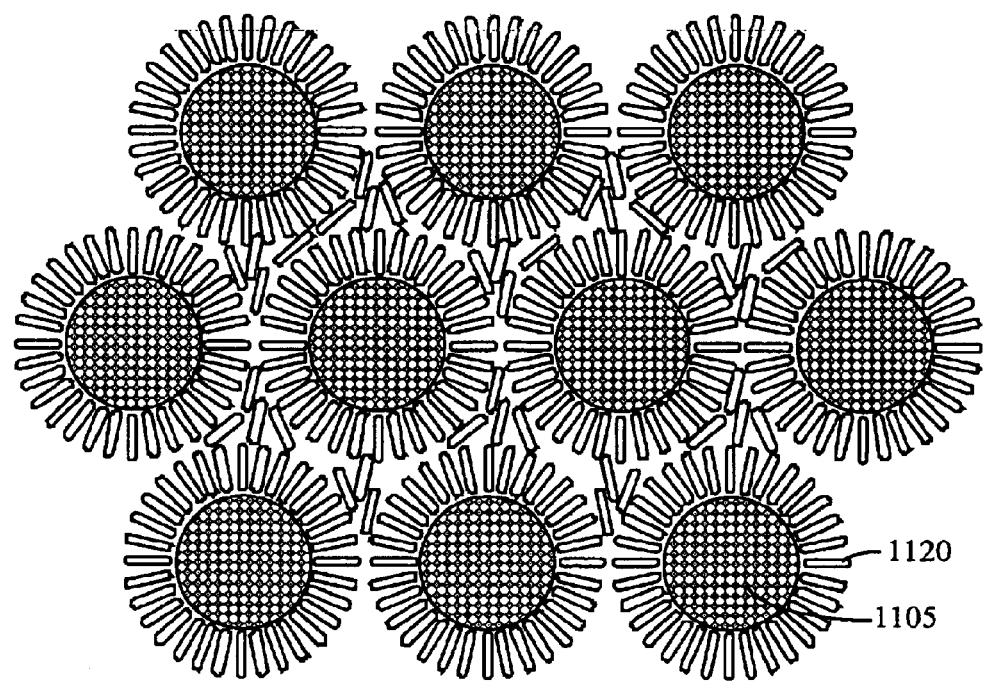
FIG. 17A is a schematic top view of a surface structure including aligned rod shaped molecules surrounding dielectric bodies according to certain principles of the present invention.
Figure 17B:
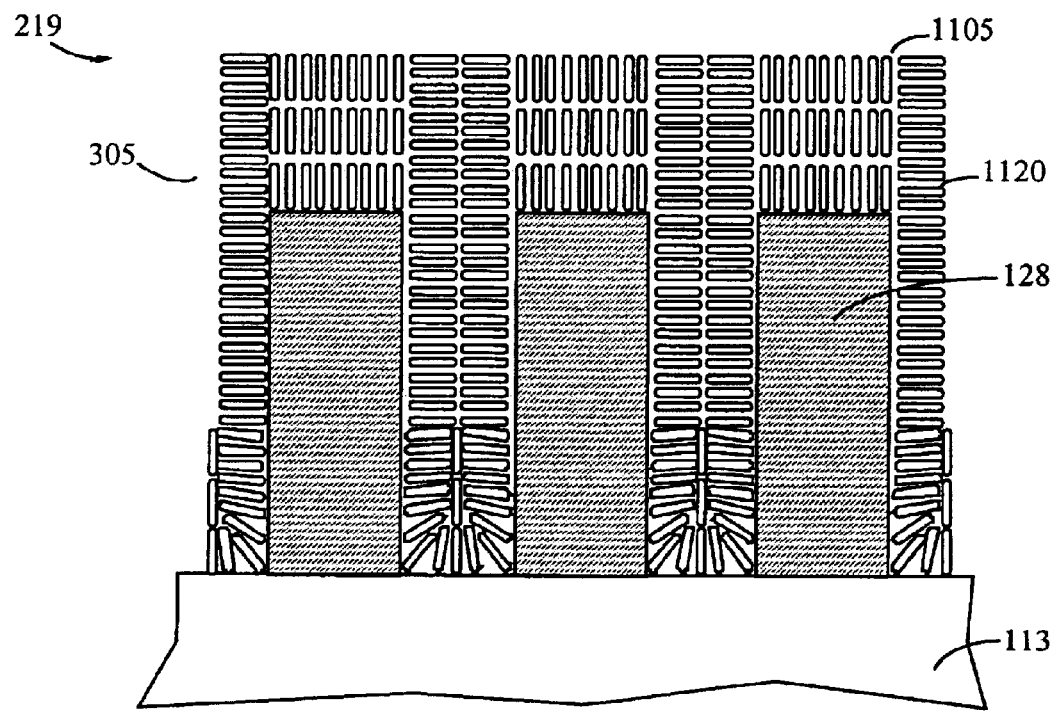
FIG. 17B is a schematic side view of a surface structure including aligned rod shaped molecules surrounding dielectric bodies according to certain principles of the present invention.

FIGS. 17A and 17B are enlarged top and cross-sectional views, respectively, of surface texture 362 in optical device 119 according to certain principles of the present invention. Liquid crystal material is shown as rods aligned perpendicularly with respect to any surface such as the vertical sides of the cylinder bodies comprising surface textures 362 or 364 in cavity 305. This alignment is generally known in the art as homeotropic alignment, a term which typically is applied to devices using flat surfaces with no surface structures.

Certain advantages can be achieved utilizing such a technique according to the principles of the present invention. For example, this aspect of the present invention involves utilizing a liquid crystal material to adjust the polarization-independent operation of a dynamically tunable optical device 119. This can be achieved by adjusting the alignment of liquid crystal molecules or rods 1105, 1120 so that the molecules align their extraordinary refractive index axis perpendicular to internal surfaces of cavity 305 when no electric field is applied.

In FIGS. 17A and 17B, the relative size of rods is exaggerated for illustrative purposes. Typically, the effect of aligning crystalline rods is achieved by a surface treatment involving the rinsing of exposed surface structures such as cylinders 128 with a liquid chemical, such as a carboxylatochromium complex surfactant, as known in the art. When cavity 305 is filled, the crystalline rods align perpendicular with the surfaces. For example, rods 1120 align perpendicular to outer walls of cylinders 128 while rods 1105 align perpendicular to a top surface of cylinder 128.

Alignment of rods 1105, 1120 can be replicated within a bulk layer of liquid crystal material by filling cavity 305 to form extended rows or columns. This molecular alignment complements the circular symmetry of the polarization independent surface structures as discussed, thus, exhibiting similar polarization independent properties as the honeycomb pattern itself.

Figure 18A:
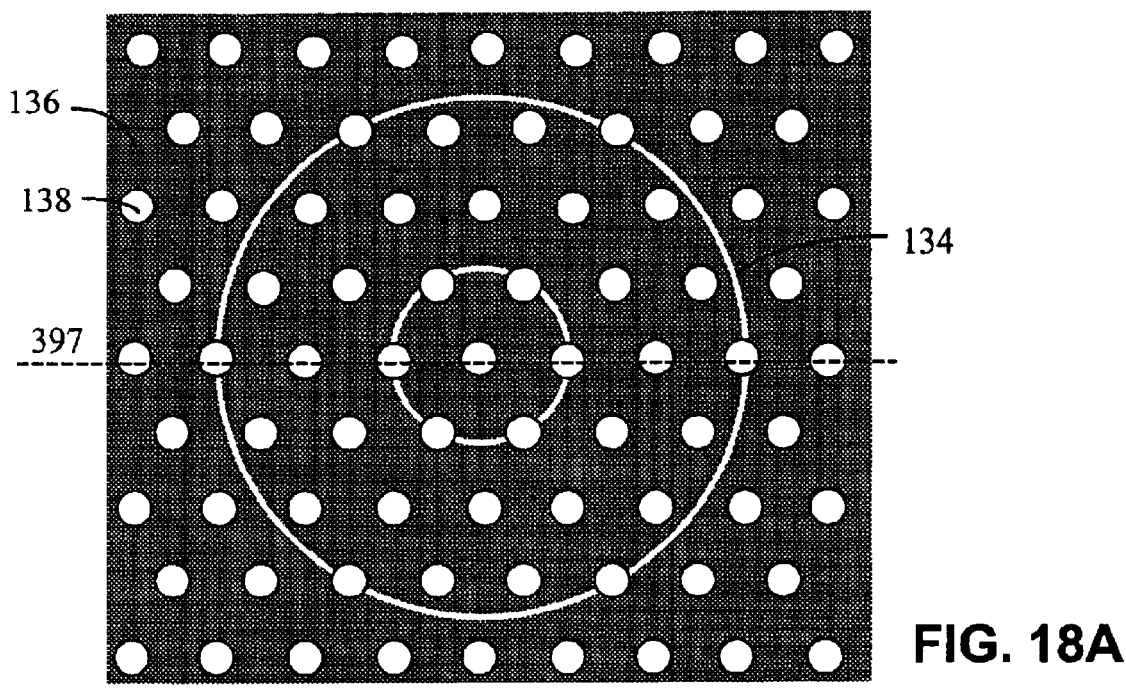
FIG. 18A is a schematic top view of a surface structure of an optical sensor device for detecting deposited materials according to certain principles of the present invention.
Figure 18B:
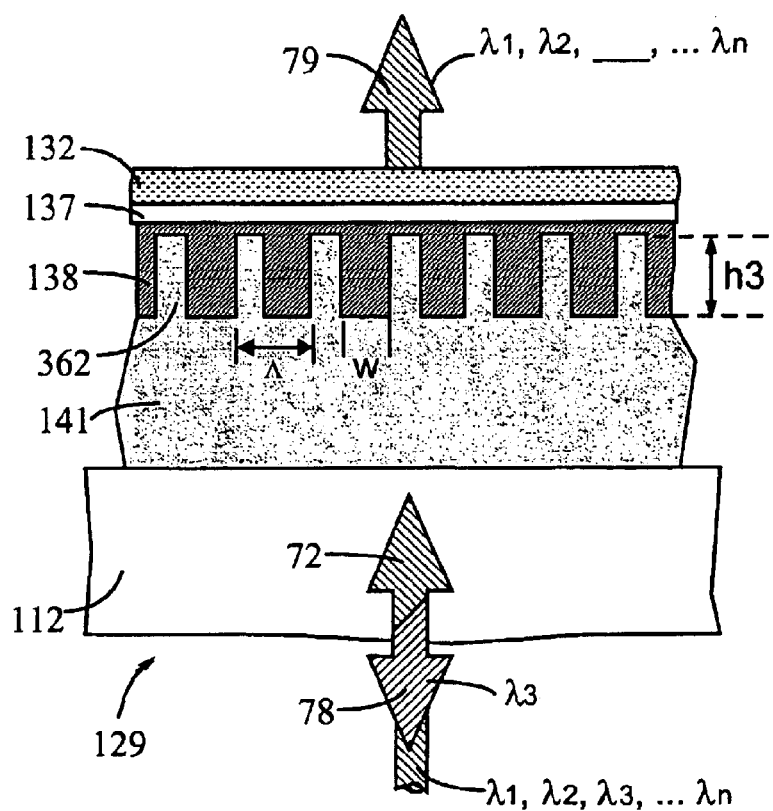
FIG. 18B is a schematic cross-sectional view of a surface structure of an optical sensor device for detecting deposited materials according to certain principles of the present invention.
Figure 18C:
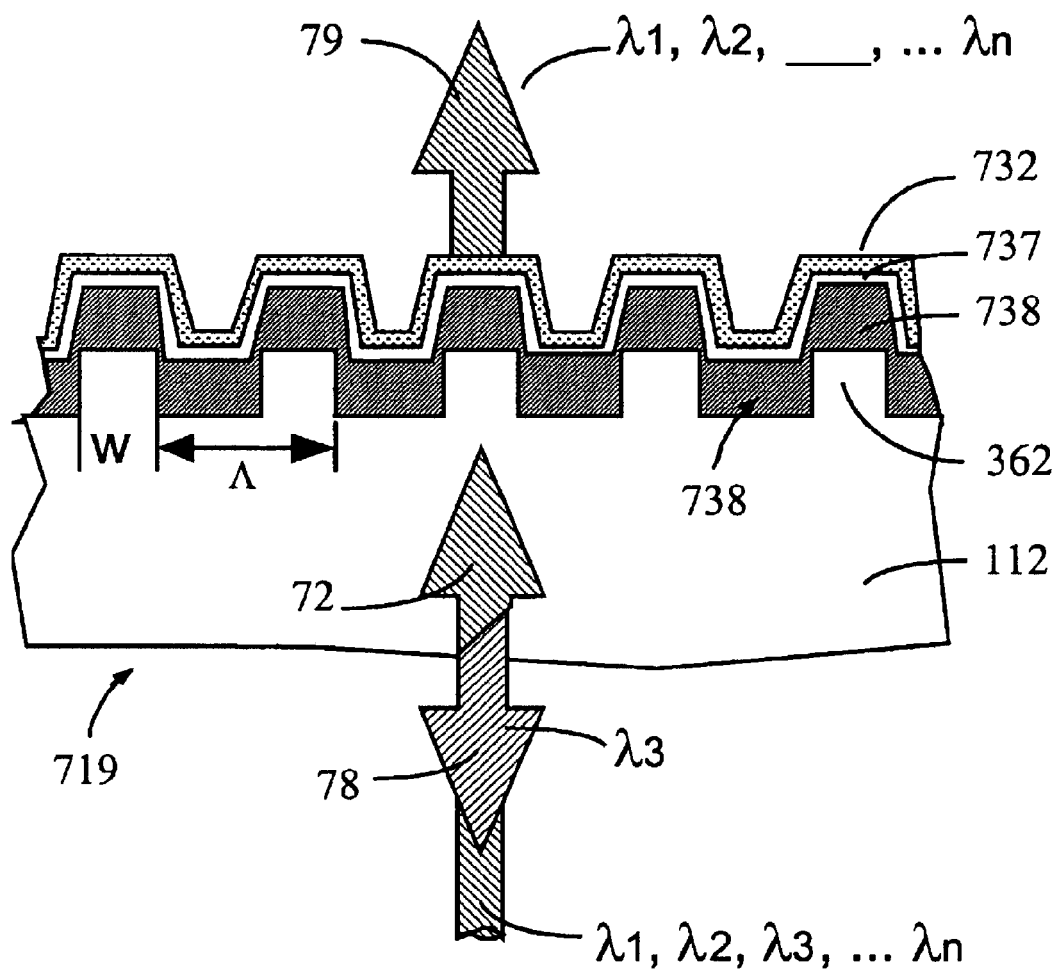
FIG. 18C is a schematic cross-sectional view of a surface structure of an optical sensor device for detecting deposited materials according to certain principles of the present invention.

FIGS. 18A, and 18B are a top view and cross-sectional view, respectively, of an optical sensor device according to the principles of the present invention. FIGS. 18A and 18C are a top view and cross-sectional view, respectively, of another optical sensor device according to the principles of the present invention. The two embodiments of FIGS. 18B and 18C look the same in their top views, hence FIG. 18A is refereed to in both instances.

In FIG. 18B, a surface texture can be embossed, etched or formed in layer 141 of optical device 129. Although any suitable material can be used to form a surface texture or surface relief pattern, layer 141 can be a polymer such as UV-cured epoxy, a variety of transparent plastics such as acrylic, polycarbonate, polystyrene, and vinyl, or a glass material such as quartz or fused silica. Other suitable materials can be used to form layer 141. As previously discussed, honeycomb surface patterns of bodies or holes such as cylindrical shaped textures can be formed in layer 141. The surface texture of layer 141 can vary depending on the application.

Layer 138 can be coated over layer 141 using a suitable method such as spin-coating. For example, a surface relief pattern or texture in layer 141 can be filled or overlaid with another material layer 138 to produce a flat surface onto which layer 137 can be deposited or coated. Layer 138 can include an excess of material over what is necessary to fill the surface texture of layer 141.

Layer 138 can be a coating of non-absorbing dielectric material such as silicon nitride, zinc sulfide, titanium oxide, indium oxide, tin oxide, tantalum pentoxide, or other suitable material. Typically, these materials have an optical index of refraction in the range of 1.8 to 2.4.

In a biotechnology application, layer 137 can be a receptor layer such as a receptor chemical or link layer. layer 137 can then be exposed to other material that chemically binds or deposits onto layer 137, forming top layer 132. A thickness of material having a specified or measurable index of refraction forming layer 132 changes the optical characteristics of optical device 129. For example, when a range of wavelengths of incident light 72 ($\lambda 1, \lambda 2, \lambda 3, \lambda 4, \ldots \lambda n$) interacts with optical device 129, a narrow range of wavelengths are redirected as reflected light 78 ($\lambda 3$), while a remainder of the wavelengths pass through device 129 as transmitted light 79 ($\lambda 1, \lambda 2, \_\_\_\_\_, \lambda 4, \ldots \lambda n$). As the thickness of material layer 132 increases, the range of wavelengths redirected as reflected light 78 is shifted toward longer wavelengths. This change in the peak resonant wavelength can be measured or identified to determine a thickness of layer 132. Accordingly, optical device 129 can be used as a sensor to detect the presence and quantity of certain matter such as proteins, chemicals, molecules, or other matter in a sample solution or substance. In one application, the wavelength of passing light 79 or reflected light 78 can be monitored over time to determine a rate at which layer 132 is deposited onto layer 137.

Another embodiment for measuring a thickness of a deposited material is shown in FIG. 18C. Similar results as previously discussed can be achieved using this embodiment. However, the cost associated with manufacturing optical device 719 is generally reduced over the optical device 129 as described in FIG. 18B. As shown in FIG. 18C, layer 141 is eliminated and a surface texture is embossed, etched or formed in substrate 112. The textured surface of the substrate can be any suitable pattern such as those previously discussed.

Layer 738 deposited on surface texture of substrate 112 can be a conformal coating of non-absorbing dielectric material such as silicon nitride, zinc sulfide, titanium oxide, indium oxide, tin oxide, tantalum pentoxide or other suitable material. Typically these materials have an optical index of refraction in the range of 1.8 to 2.4. However, the material can vary depending on the application.

A method for producing layer 738 is vacuum deposition. As shown, layer 738 is deposited evenly on surface texture 112. Thus, layer 738 itself can form a similar surface texture as that originally formed on the surface of substrate 112.

Layer 737 such as a receptor layer can be deposited on textured layer 738. This can also be a conformal coating of material such as a specific receptor chemical.

As previously discussed, subsequent layer 732 can be deposited on layer 737 to change the characteristics of optical device 719. Typically, layer 732 will be deposited in a conformal manner over 737.

In a biotechnology application, layer 737 can be a receptor layer such as a receptor chemical or link layer. Layer 737 can then be exposed to other material that chemically binds or deposits onto layer 737, forming top layer 732. A thickness of material having a specified or measurable index of refraction forming layer 732 changes the optical characteristics of optical device 719. For example, when a range of wavelengths of incident light 72 ($\lambda 1, \lambda 2, \lambda 3, \lambda 4, \ldots \lambda n$) interacts with optical device 719, a narrow range of wavelengths are redirected as reflected light 78 ($\lambda 3$), while a remainder of the wavelengths pass through device 719 as transmitted light 79 ($\lambda 1, \lambda 2, \_\_\_\_, \lambda 4, \ldots \lambda n$).

As the thickness of material layer 732 increases, the range of wavelengths redirected as reflected light 78 is shifted toward longer wavelengths. This change in the peak resonant wavelength can be measured or identified to determine a thickness of layer 732. Accordingly, optical device 719 can be used as a sensor to detect the presence and quantity of certain matter such as proteins, chemicals, molecules, or other matter in a sample solution or substance. In one application, the wavelength of passing light 79 or reflected light 78 can be monitored over time to determine a rate at which layer 732 is deposited onto layer 737.

Figure 19:
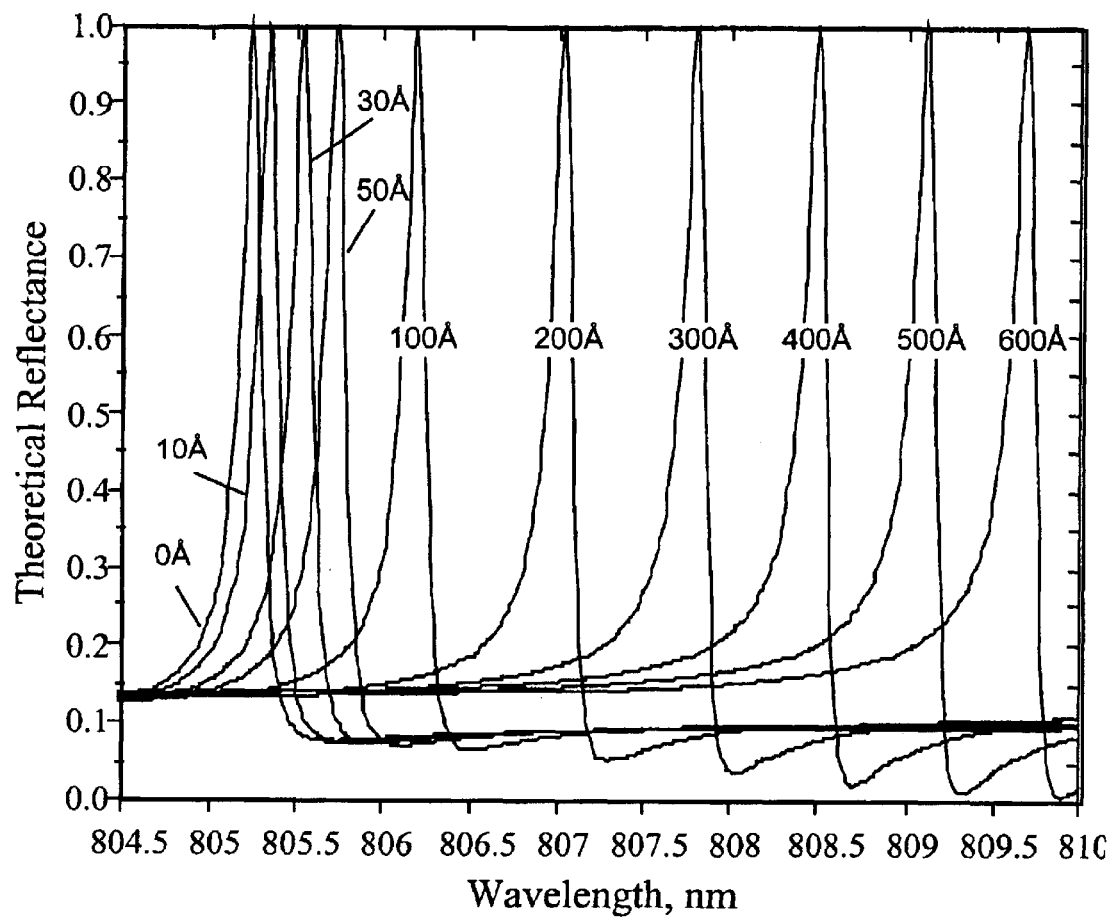
FIG. 19 is a graph illustrating a shift of a bandpass of wavelengths versus thickness for an optical sensor device according to certain principles of the present invention.

FIG. 19 is a graph illustrating a range of reflected light depending on thickness of a deposited layer according to certain principles of the present invention. Multiple reflected signals are shown where the peak wavelength of the reflected signal is shifted toward longer wavelengths as the thickness of material comprising layer 132, 732 increases.

In the embodiment corresponding to the graph, the surface texture includes cylindrical shaped columns projecting from a polycarbonate substrate to a height, h3, in a range of 140 to 200 nm (nanometers). Column bodies in the surface texture have a cross-sectional diameter, w, in the range of 240 to 280 nm, and are arranged in a honeycomb pattern. The bodies are spaced in a range between 490 to 530 nm. All of these parameters can vary depending on the application.

As shown, an optical resonance is identified for a corresponding optical device at a wavelength at or near 805 nm when no material layer such as 132 or 732 is deposited on corresponding optical devices 129 and 719 respectively. As the thickness of the deposited layer increases to 100 Angstroms, a peak reflected wavelength shifts to around 806.2 nanometers. At a thickness of 400 Angstroms, the wavelength of reflected light shifts to around 808.5 nanometers. Generally, the change in wavelength shift relative to a change in thickness is linear within a small range. Layer 138, 738 are typically formed or made of a non-absorbing dielectric material such as silicon nitride, zinc sulfide, titanium oxide, indium oxide, tin oxide, or tantalum pentoxide, all with optical index of refraction values in the range of 1.8 to 2.4. Layers 137 and 132 are made of non-absorbing materials with a substantially similar refractive index. In general the sensitivity of the sensor as indicated by the magnitude of the shift in the peak wavelength of the reflected light for a given thickness of the material layer 132, 732 is highest when the thickness of material layer 138 is minimized. Accordingly, more sensitive optical devices can be produced using thinner coatings for layers 138, 738.

Figure 20:
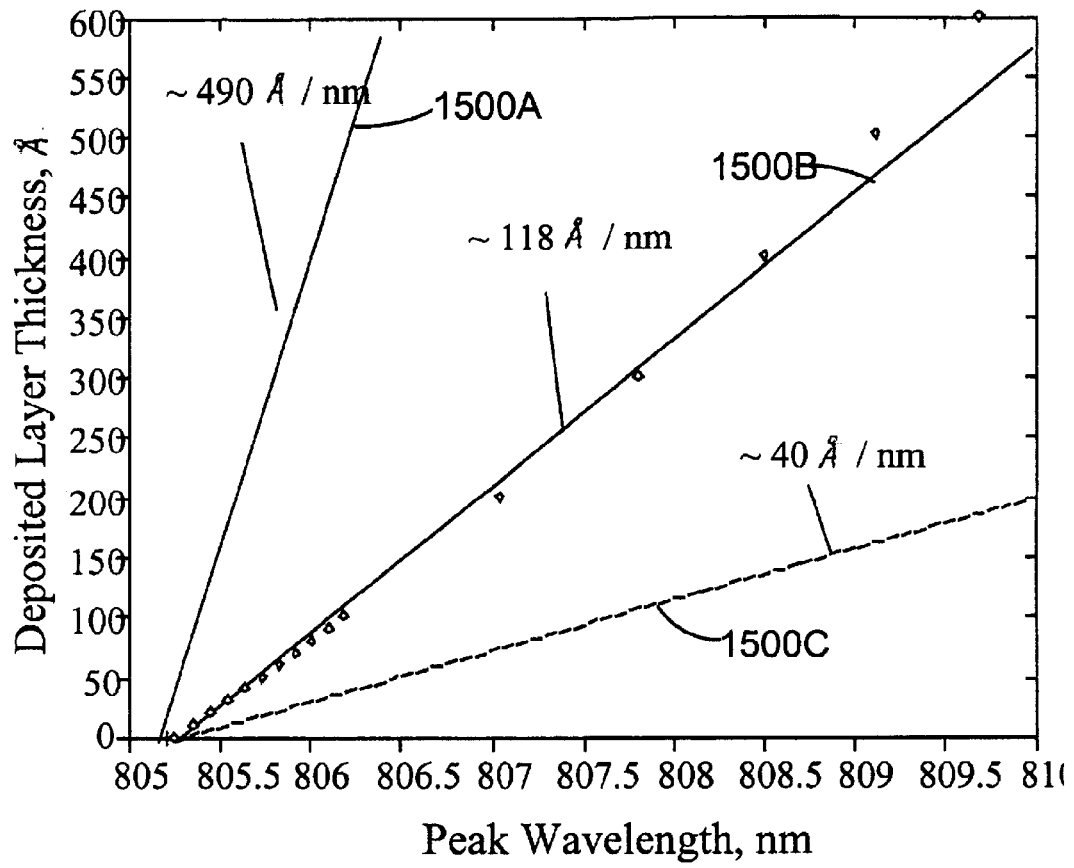
FIG. 20 is a graph illustrating a relationship between the thickness of a surface material layer and peak resonance wavelength reflected from an optical sensor device according to certain principles of the present invention.

FIG. 20 is a graph illustrating sample sensitivity of two embodiments of a guided mode surface structure sensor according to certain principles of the present invention. Each embodiment shows a linear relationship between a peak wavelength shift and thickness of a corresponding deposited material layer. When the thickness of the material layer increases above 1500 Angstroms, the optical sensor devices tend to saturate (i.e., become non-linear). Curves 1500A, 1500B and 1500C each provide a different optical sensitivity depending on dimensions of the corresponding optical device. Curve 1500C is preferred in applications requiring a greater change in shifted wavelength for a corresponding given change in thickness. In such applications, less accurate wavelength measurement devices can be used to measure a thickness of deposited material.

Figure 21:
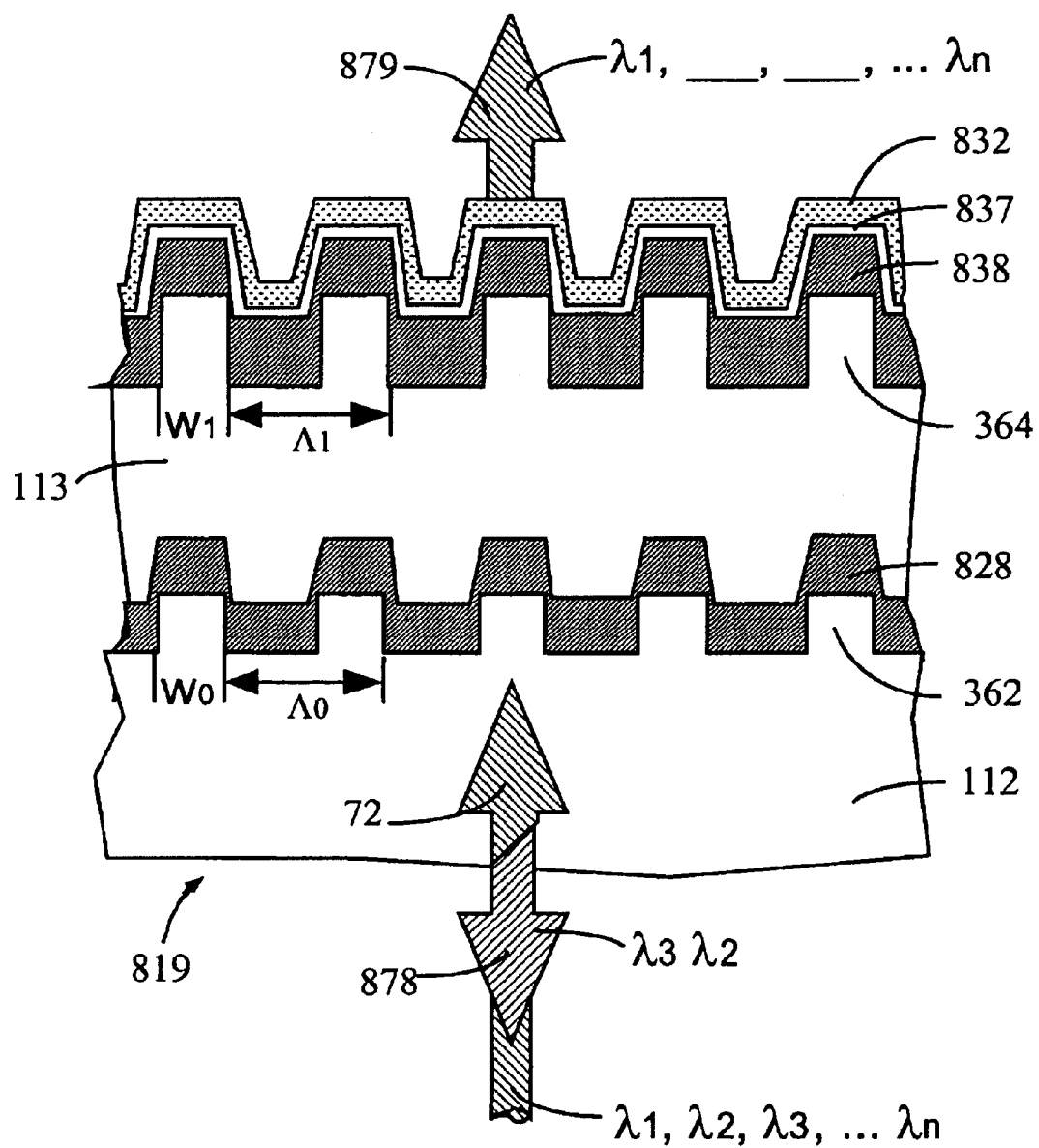
FIG. 21 is a schematic cross-sectional view of a surface structure of an optical sensor device according to certain principles of the present invention.

FIG. 21 is a double structure sensor in which first and second resonance structures simultaneously produce a static reference signal and a sensor signal (that is used to measure a deposited layer thickness), respectively.

Broadband incident light $\lambda 1, \lambda 2, \lambda 3, \lambda 4, \ldots \lambda n$ is directed towards transparent substrate 112. Generally, a first resonance surface texture is formed by the interface of textured layer 828 between substrate 112 and 113. A second resonance surface texture is formed by the interface of materials including substrate 113, layer 838, receptor layer 837, and deposited variable thickness layer 832. Based on this embodiment, two wavelengths of light are redirected as reflected light 878 (namely $\lambda 2$ and $\lambda 3$), while $\lambda 1, \_\_\_\_, \_\_\_\_, \lambda 4, \ldots \lambda n$ pass as transmitted light 879.

One wavelength of incident light redirected as reflected light 878 can be used as a reference signal while the other light that is resonantly reflected can be used as a signal whose optical wavelength shifts based on a thickness of layer 832.

An advantage of this embodiment is that common mode variations due to temperature and other ambient conditions can be eliminated. In other words, a difference in wavelength between the two resonantly reflected signals (reference and signal) can be used to more accurately determine a thickness of layer 832.

In a typical application, a difference in wavelength between $\lambda 2$ and $\lambda 3$ increases in response to an increasing thickness of the deposited material layer 832. Both the "reference" and "signal" wavelength shift an equal amount due to temperature changes or other ambient conditions so that the difference in wavelength between signals is generally constant.

In certain applications, both the reference and signal peak wavelength can vary based on a change in thickness of layer 832. In such an application, the conversion from a measured difference in wavelength is not necessarily linear.

Figure 22:
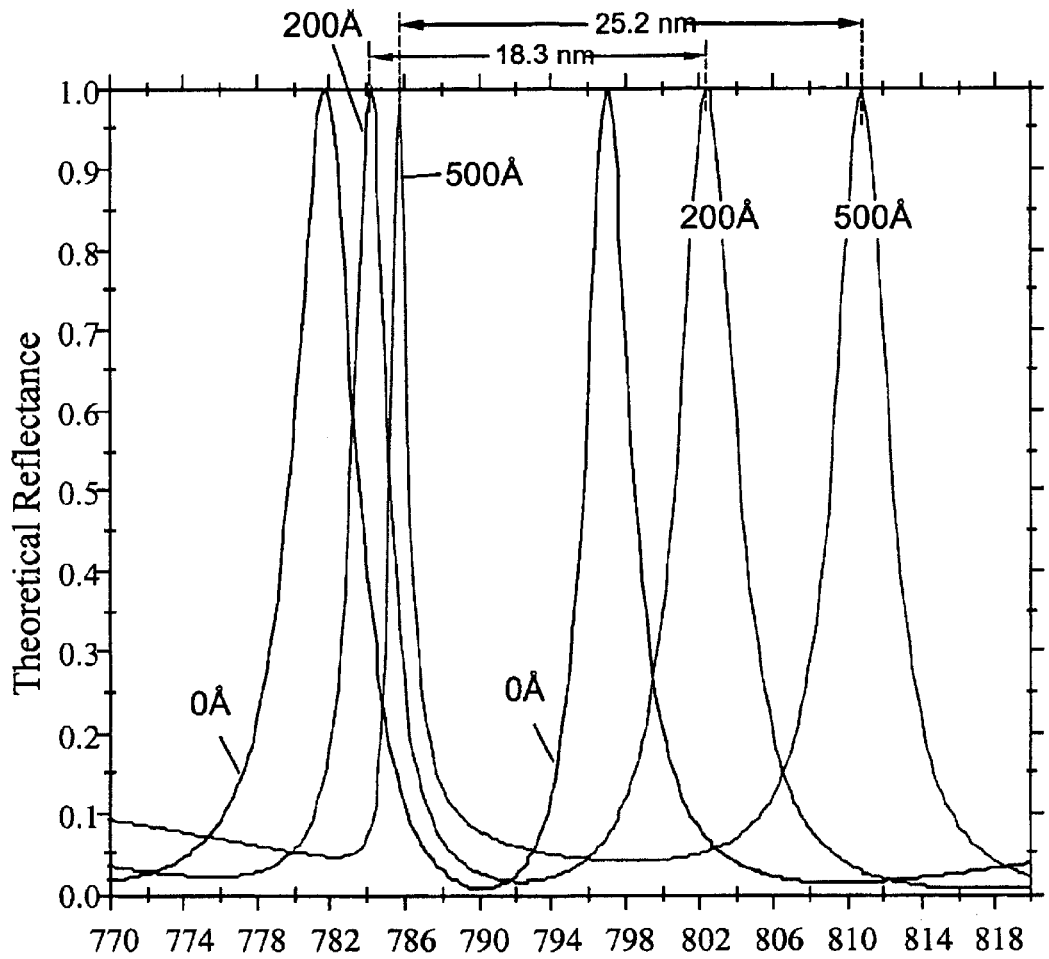
FIG. 22 is a graph illustrating a shift of wavelengths versus thickness for a dual-resonance, referencing optical sensor device according to certain principles of the present invention.

FIG. 22 is a graph illustrating reflected wavelengths of light. Notably, a difference between peak wavelengths changes depending on a thickness of layer 832. For example, the difference between peak wavelengths increases in response to increased thickness of layer 832. The three curves of the graph illustrate change in peak reflected wavelengths for layer 832 thicknesses of 0 Angstroms, 200 Angstroms and 500 Angstroms, respectively.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for filtering electromagnetic waves, the apparatus comprising:
   a first substrate having a surface relief structure containing at least one dielectric body with physical dimensions smaller than the wavelength of the filtered electromagnetic waves, such structures repeated in a two dimensional array covering at least a portion of the surface of the first substrate; and
   a second substrate having a surface relief structure containing at least one dielectric body with physical dimensions smaller than the wavelength of the filtered eletromagnetic waves such structures repeated in a two dimensional array covering at least a portion of the surface of the second substrate.

2. An apparatus as in claim 1, wherein the spacing of the surface relief structures in at least one of the arrays is substantially the same and less than the wavelength of the filtered electromagnetic waves.

3. An apparatus as in claim 2 wherein the spacing of the surface structures in the two arrays is substantially the same and less than the wavelength of the filtered electromagnetic waves.

4. An apparatus as in claim 1, wherein the first and second surfaces relief structures are positioned to face each other and form a resonant cavity therebetween, the resonant reflections between the substrates in the resonant cavity producing a further narrowing of the range of reflected light wavelengths.

5. An apparatus as in claim 4 wherein a selected index of refraction of a material disposed in the resonant cavity is chosen so as to provide a desired range of reflected light wavelengths.

6. An apparatus as in claim 3 wherein the composition of the material comprising the surface structures is chosen so as to provide a desired range of reflected light wavelengths.

7. An apparatus as in claim 3 wherein the depth, width, and spacing of the surface structures on the first and second substrates is chosen so as to provide a desired range of reflected light wavelengths.

8. An apparatus as in claim 1, wherein the individual surface relief structures on the first and second substrates are arranged in a two dimensional array forming a honeycomb pattern with circular symmetry.

9. An apparatus as in claim 1, wherein the individual surface relief structures on the first and second substrates are circularly shaped.

10. An apparatus as in claim 4, wherein a material is disposed in the resonant cavity.

11. An apparatus as in claim 10, wherein the material disposed in the resonant cavity is air.

12. An apparatus as in claim 5 wherein the material disposed in the resonant cavity is an electro-optic material.

13. An apparatus as in claim 4, wherein electromagnetic waves that are not resonantly reflected from the surface structures forming the resonant cavity, are transmitted through the first and second substrate with substantially no deviation from their incident propagation direction.

14. An apparatus as in claim 5 further comprising means for electrically modulating the index of refraction of the material disposed within the resonant cavity to dynamically tune the wavelength of the resonantly reflected electromagnetic waves, thereby allowing the wavelength of the reflected electromagnetic waves to be multiplexed in time.

15. An apparatus as in claim 1 wherein the pitches of the two arrays are different, to control the shape of the resonance.

16. An apparatus as in claim 1 wherein the duty cycles of the two arrays are different, to control the shape of the resonance.

17. An apparatus as in claim 1 wherein the depths of the two arrays are different, to control the shape of the resonance.

18. An apparatus as in claim 12 wherein the electro-optic material comprise molecules that are aligned perpendicularly to the surfaces in the grating structure so as to reduce the effect of the incident light polarization state on the filtered electromagnetic waves.

19. An apparatus as in claim 1 wherein the bodies comprising the surface relief structure are composed of a variable refractive index material, to allow dynamic tuning of the filtered electromagnetic waves.

20. An apparatus for detecting matter in a material layer by observation of a shift in the wavelength of filtered electromagnetic waves, the apparatus comprising: a substrate having a surface relief structure containing at least one dielectric body with physical dimensions smaller than a wavelength of filtered electromagnetic waves, the structures repeated in a one or two dimensional array covering at least a portion of the surface of the substrate;
   a coating on the surface relief structures of the substrate to form a guided mode resonance filter; and
   a material layer on the coating onto which a sample material can deposit, thereby producing an observable shift in the wavelength of the filtered electromagnetic waves.

21. An apparatus as in claim 20, wherein the spacing of the surface relief structures in the array substantially the same and less than the wavelength of the filtered electromagnetic waves.

22. An apparatus as in claim 20, wherein the bodies comprising the surface relief structure are arranged in a two-dimensional pattern.

23. An apparatus as in claim 22 wherein the two-dimensional pattern is a honeycomb.

24. An apparatus as in claim 20, wherein the surface relief structure is a conductive material.

25. An apparatus as in claim 24 further comprising means for applying a voltage to the surface relief structure to produce an electric field.

26. An apparatus as in claim 20, further comprising a second resonant structure coupled to the first substrate, to provide a static reference signal that can be used to determine the difference between a shifted signal due to a deposited material layer and a shifted signal due to varying ambient conditions.

27. An apparatus as in claim 1 comprising at least three spaced surface relief structures, each containing at least one dielectric body with physical dimensions smaller than the wavelength of the filtered electromagnetic waves, such structures repeated in a two dimensional array, wherein the arrays are spaced from one another along the direction of incident electromagnetic waves, to provide a desired filtration response.

28. An apparatus as in claim 27 comprising at least four such spaced surface relief structures.

29. An apparatus as in claim 20, wherein the sample material comprises an organic substance.

30. An apparatus as in claim 20, wherein the sample material comprises an inorganic substance.

* * * * *

Disclaimer

6,791,757 B2 — Douglas S. Hobbs; James J. Cowan, all of Lexington, Ma (US). OPTICAL DEVICE FOR FILTERING AND SENSING. Patent dated Sep. 14, 2004. Disclaimer filed Feb. 16, 2006, by the assignee, CoHo Holdings, LLC.

Hereby enters this disclaimer to claims 20-30.

*(Official Gazette, August 1, 2006)*